United States Patent
Saleh et al.

(10) Patent No.: US 12,353,987 B1
(45) Date of Patent: Jul. 8, 2025

(54) MODULAR SoC AI/ML INFERENCE ENGINE WITH DYNAMIC UPDATES USING A HUB-AND-SPOKE TOPOLOGY AT EACH NEURAL NETWORK LAYER

(71) Applicant: DDAIM Inc., Jupiter, FL (US)

(72) Inventors: Thomas J. Saleh, Norwalk, CT (US); Laura C. Trumbull, West Chester, PA (US); Lawrence C. Rafsky, Jupiter, FL (US)

(73) Assignee: DDAIM Inc., Jupiter, FL (US)

( * ) Notice: Subject to any disclaimer, the term of this patent is extended or adjusted under 35 U.S.C. 154(b) by 0 days.

(21) Appl. No.: 18/798,833

(22) Filed: Aug. 9, 2024

Related U.S. Application Data

(60) Provisional application No. 63/661,946, filed on Jun. 20, 2024.

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC ................................ G06N 3/063; G06N 3/04
See application file for complete search history.

(56) References Cited

U.S. PATENT DOCUMENTS

| 9,792,397 B1 | 10/2017 | Nagaraja |
| 10,268,951 B2 | 4/2019 | Sekiyama et al. |

(Continued)

FOREIGN PATENT DOCUMENTS

| CN | 110462640 A | 11/2019 |
| CN | 110462642 A | 11/2019 |

(Continued)

OTHER PUBLICATIONS

Wang, Zhaoze, and Junsong Wang. "A Versatile Hub Model For Efficient Information Propagation And Feature Selection." arXiv preprint arXiv:2307.02398 (2023). (Year: 2023)*

(Continued)

*Primary Examiner* — Randall K. Baldwin
(74) *Attorney, Agent, or Firm* — Gearhart Law LLC

(57) ABSTRACT

An electronic circuit system implementing and executing machine learning inference engines. While ML inference engines are based on (architectures and parameters defined by) configured, trained and tuned machine learning models, our design has the novel ability to support data driven, on-the-fly-reconfigured model runs. Reconfiguration and tuning operations include dynamic computational graph modifications, define-by-run alterations, changes to network depth (number of layers) and width (neurons per layer), and adjustments to weights, biases, plus activation function parameters. Neural networks supported include Feed-Forward, RNN, CNN, and Hopfield architectures, plus Ensemble, Federated, Cooperating, Adversarial, and Swarm collections. Decision Trees and Forests are also supported, as are more esoteric approaches such as ART and KAN. Our invention is capable of running both standalone and cooperatively, the cooperative processing being local and/or remote/cloud based, interfacing with telemetry applications to feed data, and machine learning software to feed new or updated models.

42 Claims, 23 Drawing Sheets

(56) References Cited

U.S. PATENT DOCUMENTS

| | | |
|---|---|---|
| 10,372,859 B2 | 8/2019 | Nagaraja |
| 10,387,298 B2 | 8/2019 | Baum et al. |
| 10,558,914 B2 | 2/2020 | Sekiyama et al. |
| 11,216,717 B2 | 1/2022 | Baum et al. |
| 11,221,929 B1 | 1/2022 | Katz et al. |
| 11,237,894 B1 | 2/2022 | Baum et al. |
| 11,238,331 B2 | 2/2022 | Baum et al. |
| 11,238,334 B2 | 2/2022 | Baum et al. |
| 11,263,077 B1 | 3/2022 | Seznayov et al. |
| 11,263,512 B2 | 3/2022 | Baum et al. |
| 11,354,563 B2 | 6/2022 | Baum et al. |
| 11,461,614 B2 | 10/2022 | Baum et al. |
| 11,461,615 B2 | 10/2022 | Baum et al. |
| 11,461,637 B2 | 10/2022 | Sekiyama et al. |
| 11,514,291 B2 | 11/2022 | Baum et al. |
| 11,526,746 B2 | 12/2022 | Kursun |
| 11,544,545 B2 | 1/2023 | Baum et al. |
| 11,551,028 B2 | 1/2023 | Baum et al. |
| 11,615,297 B2 | 3/2023 | Baum et al. |
| 11,675,693 B2 | 6/2023 | Baum et al. |
| 11,811,421 B2 | 6/2023 | Kaminitz et al. |
| 11,874,900 B2 | 1/2024 | Kaminitz et al. |
| 2016/0006294 A1 | 3/2016 | Chetlur et al. |
| 2016/0035807 A1 | 12/2016 | Brothers et al. |
| 2018/0014424 A1 | 5/2018 | Masoud et al. |
| 2018/0285254 A1 | 10/2018 | Baum et al. |
| 2018/0285678 A1 | 10/2018 | Baum et al. |
| 2018/0285718 A1 | 10/2018 | Baum et al. |
| 2018/0285719 A1 | 10/2018 | Baum et al. |
| 2018/0285725 A1 | 10/2018 | Baum et al. |
| 2018/0285726 A1 | 10/2018 | Baum et al. |
| 2018/0285727 A1 | 10/2018 | Baum et al. |
| 2018/0285735 A1 | 10/2018 | Baum et al. |
| 2018/0285736 A1 | 10/2018 | Baum et al. |
| 2019/0026648 A1 | 8/2019 | Sekiyama et al. |
| 2019/0355483 A1* | 11/2019 | Smurro .................. A61B 34/30 |
| 2020/0005127 A1 | 1/2020 | Baum et al. |
| 2020/0242146 A1* | 7/2020 | Kalukin .............. G06F 16/3329 |
| 2020/0279133 A1 | 9/2020 | Baum et al. |
| 2020/0285892 A1 | 9/2020 | Baum et al. |
| 2020/0285949 A1 | 9/2020 | Baum et al. |
| 2020/0285950 A1 | 9/2020 | Baum et al. |
| 2020/0034229 A1 | 10/2020 | Croxford et al. |
| 2022/0100601 A1 | 3/2022 | Baum et al. |
| 2022/0101042 A1 | 3/2022 | Kaminitz et al. |
| 2022/0101043 A1 | 3/2022 | Katz et al. |
| 2022/0103186 A1 | 3/2022 | Kaminitz et al. |
| 2022/0011391 A1 | 4/2022 | Kuriata et al. |
| 2022/0309314 A1* | 9/2022 | Park ....................... G06N 3/063 |
| 2023/0161997 A1 | 5/2023 | Baum et al. |
| 2024/0394521 A1* | 11/2024 | Rose ....................... G06N 3/063 |
| 2025/0119354 A1* | 4/2025 | Vasseur ................. H04L 41/147 |

FOREIGN PATENT DOCUMENTS

| | | |
|---|---|---|
| CN | 110462643 A | 11/2019 |
| CN | 110476174 A | 11/2019 |
| CN | 110494869 A | 11/2019 |
| EP | 3607497 A1 | 2/2020 |
| EP | 3607498 A1 | 2/2020 |
| EP | 3607499 A1 | 2/2020 |
| EP | 3607500 A1 | 2/2020 |
| EP | 3607501 A1 | 2/2020 |
| JP | 2020515989 A | 5/2020 |
| JP | 2020515990 A | 5/2020 |
| JP | 2020515991 A | 5/2020 |
| JP | 2020517005 A | 6/2020 |
| JP | 7108268 B2 | 7/2022 |
| WO | 2017038104 A1 | 3/2017 |
| WO | 2018185762 A1 | 10/2018 |
| WO | 2018185763 A1 | 10/2018 |
| WO | 2018185764 A1 | 10/2018 |
| WO | 2018185765 A1 | 10/2018 |
| WO | 2018185766 A1 | 10/2018 |
| WO | 2022203809 A1 | 9/2022 |

OTHER PUBLICATIONS

Setareh, Hesam, et al. "Cortical dynamics in presence of assemblies of densely connected weight-hub neurons." Frontiers in computational neuroscience 11 (2017): 52. (Year: 2017)*

"AI SOC Solutions", Palo Alto Networks; Website Link: https://www.paloaltonetworks.com/cyberpedia/revolutionizing-soc-operations-with-ai-soc-solutions, retrieved on Jun. 25, 2024, pp. 19.

Flamand et al., "GAP-8: A RISC-V SoC for AI at the Edge of the IoT", IEEE 29th International Conference on Application-specific Systems, Architectures and Processors, 2018, pp. 1-4.

Ghioni et al., "Open source intelligence and AI: a systematic review of the GELSI literature", AI & SOCIETY, vol. 39, No. 4, dated Jan. 28, 2023, pp. 1-16.

Hung et al., "Challenges and Trends of Nonvolatile In-Memory-Computation Circuits for AI Edge Devices", IEEE Open Journal of the Solid-State Circuits Society, vol. 1, dated Oct. 26, 2021, pp. 171-183.

Cherney et al., "Intel sees AI opportunity for standalone programmable chip unit", Reuters; Website Link: https://www.reuters.com/technology/intel-sees-ai-opportunity-standalone-programmable-chip-unit, retrieved on Jun. 25, 2024, pp. 11.

Vijay Janapa Reddi, "Machine Learning Systems", Harvard University, retrieved on Jun. 25, 2024, pp. 1138.

Torres-Sánchez, et al., "Developing an AI IoT application with open software on a RISC-V SoC", XXXV Conference on Design of Circuits and Integrated Systems (DCIS), dated Nov. 18, 2020, pp. 1-6.

"AI drives explosion in edge computing", AXIOS; Website Link: https://www.axios.com/2024/02/16/ai-edge-computing-5g, retrieved on Jun. 25, 2024, pp. 6.

Rosencrance et al., "Industry Talks: Edge Computing Opens a Path for Growing Data Center Needs", Techopedia; Website Link: https://www.techopedia.com/industry-talks-edge-computing-opens-a-path-for-growing-data-center-needs, retrieved on Jun. 25, 2024, pp. 14.

Smith et al., "Generative AI Slims Down for a Portable World:> Consumer tech aims LLMs everywhere-with laptops as the beachhead", IEEE Spectrum, vol. 61, No. 2, Feb. 2024, pp. 5-13.

"Machine Learning and Signal Processing" IEEE International Solid-State Circuits Conference, 2018, pp. 327.

Carlos E. Perez, "PyTorch, Dynamic Computational Graphs and Modular Deep Learning", Medium; Website: https://medium.com/intuitionmachine/pytorch-dynamic-computational-graphs-and-modular-deep-learning-7e7f89f18d1, retrieved on Jun. 25, 2024, pp. 10.

* cited by examiner

Showing four unallocated hubs

MODULAR SoC AI/ML INFERENCE ENGINE WITH DYNAMIC UPDATES USING A HUB-AND-SPOKE TOPOLOGY AT EACH NEURAL NETWORK LAYER

CROSS-REFERENCE TO RELATED APPLICATIONS

This application is a U.S. Non-Provisional patent application that claims priority to U.S. Provisional Patent Application No. 63/661,946 (the '946 Provisional), filed on Jun. 20, 2024 titled "A Deep Learning General Neural Network Execution Engine", the contents of which are hereby fully incorporated by reference in its entirety.

FIELD OF THE EMBODIMENTS

The present invention relates to a System-on-a-Chip (SoC) artificial intelligence/machine learning (AI/ML) hardware (or software) inference engine that performs inferencing for a previously-defined (trained) AI/ML model supplied to it, in other words, a system for computing the model's answer (prediction) for every new input data instance sent to it, even sequentially in real-time. The system innovatively supports in-the-field, while running, model design changes and model parameter updates via a new implementation of neural network topologies, while at the same time exploiting these topologies to reduce hardware build costs, maintenance costs, and runtime energy consumption. Note that the while-running dynamic model alterations and updates can be comprehensive: changes to shape (width/depth), activation functions, all weights and biases, and more are supported; remarkably the system can self-assess, self-learn, and suggest changes on its own, as well as responding to change orders from external systems that are re-estimating (perhaps continually) the base model. Specifically the innovation relates to a modular System-on-a-Chip (SoC) interference engine built using a hub-and-spoke topology at each neural network layer. This topology is the key to supporting the adaptive model-changing capability, allowing self-improvement, and achieving lower costs; the topology is referred to as Chip Hierarchical Architecture MachinE Learning Engine Optimizing Nodes (CHAMELEON).

While the title is descriptive and in accordance with the USPTO rules that impose limitations on title length, the following longer one is believed to be more descriptive and accurate: "A Deep Learning General Neural Network Execution Engine for Inference, Tuning, and On-the-Fly Model Changes Implemented as a System-on-a-Chip, Featuring Economical Wire-Interconnect Topologies for Reduced Manufacturing Costs and Power Requirements plus Configurable Runtime-Adaptive Data-Driven Routing, Computational Layer Sequencing, and Circuit Segregation, thereby Facilitating a High Degree of Parallel Processing, Dynamic Computational Graphs, Shape, Structure, and Width/Depth Changes, Self-Diagnosed or Ordered by External Servers, including Define-by-Run and Dynamic Computational Graphs, plus Ensemble Construction and Sub-Model Interconnects Allowing Even Recursive Invocation.

BACKGROUND OF THE EMBODIMENTS

It is harder to develop a recipe than it is to use it. The same is true for machine learning (ML) models. This has important real-world implications and suggests some dramatic improvements to the current state-of-the-art that have not been sufficiently exploited by AI/ML engineers. Our invention changes that.

If a recipe proves too hard to follow, home cooks naturally simplify it in various ways, trying not to lose the appeal of the finished dish. That is not the most sophisticated approach-perhaps better kitchen tools (that might not have been invented yet!) are the right answer. This describes, at least partially, the less-than-optimal current state of AI/ML. Complex ML models are in fact simplified by engineers before they are run, a process referred to as distillation. Distillation is good, we embrace it, but we have gone much further and invented new tooling that provides a vastly superior solution.

ML model development is known as "training and tuning" (often just "training"); subsequent use of the model, in the real world on newly presented data, is known as "inference". Of course, the entire premise is this: data that runs through the model during inference should closely resemble data used to train (build) the model.

This is assured, or at least assumed, for the following reason: the underlying data generation or collection processes used to assemble the training data are the same as those which produce data for inference. When this ceases to be the case, as might be observed by looking at (and statistically testing for changes) the actual incoming data, or noticing that using the model for inference no longer produces acceptably accurate answers, re-training is necessary. Re-training is as resource intensive and difficult as the original training: it requires considerable computing power and large amounts of data.

Running the model in inference mode requires far less effort, and of course (by definition) only the newly-arriving individual data sets, presented one-at-a-time, are needed. Effort is further reduced by distillation, as mentioned above, but, while results are produced faster, this does only a little to control costs and nothing to help with re-training.

Note that, to address some of this engineering pain, R&D in the industry has heretofore been focused on developing specialized hardware, for both training and inference, often installed in limited-power devices running "at the edge". The manufacturing costs for such specialized hardware are considerable, both because the hardware is in fact specialized, and because it is complex. But even worse than the high initial cost, while power consumption might be less, nothing in this approach—the current approach before our invention—reduces the re-training burden and coordination effort. Not being able to quickly, in the field, update a model without system down time, or complex maintenance procedures, really hampers the spread of AI/ML to every device everywhere, the clear goal of the industry.

Novel aspects of the disclosure are able to be more easily understood through the presentation of simplified Telecommunications Industry examples presented in figures and detailed throughout the disclosure.

Prior Art FNN and RNN in an Example of a Telecommunications Company (TELCO) Monitoring System A feed-forward neural network (FNN) is one of the broad types of artificial neural networks, characterized by the direction of the flow of information from layer to layer. This flow is uni-directional, meaning that the information in the model flows in only one direction-forward—from the input layer through the hidden layers and finally to the output layer, without any cycles or loops (in contrast to recurrent neural networks, which have information loop-backs).

FIG. 1 (PRIOR ART) shows a standard feed-forward neural network, with 2 hidden layers (4 neurons per layer), for predicting state changes. The FNN tracks the state of an external running system, which for illustrative purposes is a telecommunication network, referred to as the TELCO ("Telecommunications Company") . . . . Referring to the system as the TELCO clarifies that discussions herein are directed at the goal of predicting the operational state of the telecommunications network, which is what the FNN is tracking (or "watching"), as opposed to referring to an implementation state of the FNN itself. The FNN probabilistically tracks the TELCO operational state, which means that some of the FNN's predictions will inherently be inaccurate, though a high quantity of inaccuracies indicates that the FNN needs to be retrained or updated. The default properly-operating state of the TELCO is denoted as GREEN, an intermediate (less than perfectly operating) state is denoted by YELLOW, and a failure state is RED. When the state is GREEN all is operating smoothly. When the state is YELLOW, some troubles have been detected (e. g., hardware failures, software errors, message traffic congestion, dropped messages, hacking attacks, etc.) but the TELCO is still operating within its operational requirements.

In actual practice for the TELCO, there are hundreds of input measurements, most likely including network call volume for every pair of countries, plus statistics on call duration, echo, jitter, dropped packets, etc. for every pair. The machine learning model needs to know the monitored system's current state, which takes the value "Unknown" if in fact the state cannot be determined. In FIG. 1A (PRIOR ART) these inputs are represented in this simplified example by X1 through X8. In addition to these 8 input data values, the current state of the system being monitored needs to be an input, and that is represented by Xst. These nine X values arriving at model nodes form the Input Layer of the Feed Forward Neural Network, as shown.

Completing the Neural Network, there are two hidden layers (Layers 2 and 3), the Output Layer (where the predicted state of the system being monitored is produced), and finally a Decision Layer where an Alert is generated in certain circumstances dictated by the concerns of the managers of the system being monitored (the TELCO). For example, a change of the current state to a predicted state of About to Fail or to Failed would generate an alert (the exact nature of the Alert logic is not important for this illustration).

For the neural network to do its computations, the two hidden layers (Layers 2 and 3), the Output Layer (Layer 4), and the Decision Layer (Layer 5) need the weights, and bias values, and activation function to be used by each neuron of each layer (this is the standard way neural networks proceed). These inputs 101 arrive at the machine implementing this neural network. In this example, we assume Layer 2 and Layer 3 (the hidden layers) use 4 neurons each, and (by the definition of possible states and the alert generation required) Layer 4 has 5 neurons, and Layer 5 (the Alert layer) has one.

By the definition of a Neural Network, the outputs from one layer become the inputs to the next layer, and this can be seen in FIG. 1A (PRIOR ART) by the arrows connecting the neurons in each layer (a "fully connected network"), which we depict in the drawing as N(Layer #, Neuron #), e.g., N(2,1), N(2,2), etc. Extending this notation to the weights (as well as the bias values and activation function parameter), we use the notation W(Layer #, neuron #, Weight #) to denote Weights (and a similar notation could be used for the bias values and activation function parameters), but we do not show that in our drawings since it adds nothing to the exposition). Of course, as just mentioned regarding the outputs from a particular layer being the inputs to the next layer, the maximum value of neuron # in W(L, neuron #, Weight #) must also be the maximum value of Weight # in W(L+1, neuron #, Weight #).

The complexity of the interconnections, and hence the large number of wires needed to implement the neural network using the current state-of-the-art engineering can be easily understood from the following table:

| Input Layer- | Inbound Connections | 8 |
| Data Signal Lines | Outbound Connections | 8 |
| Hidden Layer 1 | Inbound Connections | 8 (equal to above) |
| | Outbound Connections | 4 |
| Hidden Layer 2 | Inbound Connections | 4 (equal to above) |
| | Outbound Connections | 4 |
| Output Layer | Inbound Connections | 4 (equal to above) |
| | Outbound Connections | 5 |
| Alert Layer | Inbound Connections | 5 (equal to above) |
| | Outbound Connections | 2 |

If in fact the model predicts a state change, this prediction needs to not only generate an Alert, but it might also (depending on the exact mechanics of the TELCO, the system being monitored), need to be supplied to the computing stage that handles the input Xst, and the computing stage that informs the Decision Layer alert logic of the current state—this is shown by 102, and is also the reason that the Alert Layer has 2 outbound connections as noted in the table above.

Recurrent neural networks (RNNs) are a class of artificial neural networks for sequential data processing. Unlike feedforward neural networks, which process data in a single pass, RNNs process data across multiple time steps, making them well-adapted for modeling and processing text, speech, and time series.

The fundamental building block of an RNN is the recurrent unit. This unit maintains a hidden state, essentially a form of memory, which is updated at each time step based on the current input and the previous hidden state. This feedback loop allows the network to learn from past inputs and incorporate that knowledge into its current processing.

FIG. 2 (PRIOR ART) shows a recurrent neural network (RNN), with 2 hidden layers for predicting state changes. FIG. 1B is identical in concept to the FNN of FIG. 1A (PRIOR ART), except that an RNN (Recurrent Neural Network) is diagrammed. Nothing has been changed from FIG. 1A and the inputs 201 and 202 play the exact same role as inputs 101 and 102, except that each neuron in Layers 2 and 3 (the two hidden layers) feedback their output values to themselves, implementing the "memory" aspect of RNNs. Other feedback loops could be added, for example, data feed from neurons in Layer 3 back to neurons in Layer 2 without impacting the point we are making with these diagrams. RNNs add additional wiring complexity and increase the total wire count (to accommodate the feedback loops); there are no other conceptual differences.

RELATED ART

US20160358070A1 discloses tuning a neural network which may include selecting a portion of a first neural network for modification to increase computational efficiency and generating, using a processor, a second neural network based upon the first neural network by modifying the selected portion of the first neural network while offline.

WO2017038104A1 discloses an installation device designed to allow for the installing of an algorithm which executes machine learning in an embedded chip.

U.S. Pat. No. 11,526,746B2 discloses state-based learning using one or more adaptive response states of an artificial intelligence system.

US20200342291A1 discloses a method for selecting between multiple neural networks. U.S. Pat. No. 11,461,637B2 discloses a generated algorithm used by a neural network that is captured during the execution of an iteration of the neural network.

US20180144244A1 discloses techniques for training a deep neural network from user interaction workflow activities occurring among distributed computing devices U.S. Pat. No. 9,792,397B1 discloses designing SoC using AI and Reinforcement Learning (RL) techniques.

Additional noteworthy references include US20190266488A1, US20160062947A1, U.S. Pat. No. 10,372,859B2, and WO2022203809A1. Further, numerous articles and books were noted in the '946 Provisional, which has been incorporated herein.

SUMMARY OF THE EMBODIMENTS

In general, we have invented a new type of inference engine employing a circuit design that dramatically lowers manufacturing costs and energy consumption, while also adding a remarkable feature: in-the-field model modifications (even substantial ones) and parameter value changes can be implemented without re-programming, just by loading simple data constants.

It is important to understand that these modifications can be triggered manually or automatically by updates to the trained model done by the model's managers or engineers, done in fact on any local, remote, or cloud computer, located in any data center. With our circuitry, the modifications can be triggered automatically by various data conditions (statistically significant observed changes in the distribution of inputs) or model results observed (lack of accuracy, for instance), and then acted upon, all by the inference engine itself. This, along with other run-time adaptations, like early stopping of the neural network and skipping to the final inference output (when some but not all of the layers of the network have been exercised) achieves what is sometimes called "dynamic computational graphs" or "define-by-run", widely recognized as important but never before achieved in hardware.

Without our invention, manufacturers of "at the edge" AI inference engines face two choices, both quite sub-optimal. A first choice is to use an FPGA ("Field Programmable Gate Array") to allow for modifications of the machine learning model post-training. While this option has been much discussed in the industry, FPGAs are expensive and power-hungry: every wiring cross-connect is active. Engineers often joke about this situation noting "you want to buy the logic but you pay for the wires." The second choice is to use an ASIC ("Application-Specific Integrated Circuit"). An ASIC is cheap to build (once the initial fabrication is done and the cost amortized) and run, but it is not modifiable once it is manufactured.

Our invention is the first to hit the sweet spot: a circuit topology that, when combined with modest CPUs, is fully adjustable via simple data parameter loading, loading that is fast enough to be slotted in while the inference engine is running, processing input data sets. While running in the real-world as an interference engine, for example, the following can be done: layers can be added to a deep learning module, more neurons can be added to a layer, a FNN can be converted to a RNN or a convolution neural network (CNN), more receptor fields can be added to a CNN, additional inference models can be instantiated to create an ensemble, a Hopfield network can be run as an alternative to a deep-learning one, a number of inputs for each inference instance can be increased or decreased, and transformed versions (like Box-Cox) or lagged (like nth-order difference) versions of input variables can be added to the model. All of the above can be done on a currently installed and running chip when implementing our disclosed innovations. Our basic engineering approach is to dramatically replicate simple sub-circuits, not construct large complex ones. Everything, especially circuit resets (which happen at every data inference instance arrival), runs faster and consumes much less power.

Our disclosure includes numerous non-conventional innovative planks in the artificial Intelligence (AI) and System-on-a-Chip (SOC) space, which include:

1) using real-time control logic referred to as a Halt/Update Reload/Resume Interface (HURRI) protocol;
2) using sized (S, M, L, XL, and XXL) versions of SOC hardware enabling application builders to control costs by choosing a "right sized" application-specific integrated circuit (ASIC) or field-programmable gate array (FPGA), which is an approach referred to as Sized Topology Architecture for New Data and Update Processing (STAND-UP);
3) using a hub-and-spoke ("wagon wheel" or "star") topology at each layer of a neural network, which is referred to as Chip Hierarchical Architecture MachinE Learning Engine Optimizing Nodes (CHAMELEON);
4) configuring multiple machine learning models (post training or re-training) to update multiple inference execution engines, referred to as Multiple Inference Unified Edge Training or (MINUET);
5) taking a parameterized approach to defining a flexible family of linear splines to closely approximate standard activation functions, referred to as Piecewise ReLU (rectified linear unit) Dynamic Evaluator (PRELUDE); and
6) enforcing quantization of input values and parameters when the trained model was not distilled, thereby limiting arithmetical and logical operations needed, which is referred to as Reduced Arithmetic Instruction Logic (RAIL).

The noted innovative planks yield combinative effects as is expressed herein. For example, STAND-UP SoCs, "right-sized" for the problem and budget at hand, allow unrestricted changes to weights, biases, activation functions, number of layers, neurons-per-layer, and placement (addition and deletion) of recurrent feedback connections without re-programming, accomplishing this with a fast data-load step (expected to be only a few milliseconds in most cases) controlled by the HURRI protocol. The reduction of total wire count via CHAMELEON innovations, results in making the "right sizing" of hardware per STAND-UP SoCs much more economical. Given the interrelated nature of the innovations, the disclosure has opted to guide discussions from a CHAMELEON perspective, as evidenced by focusing on conventional FNNs (FIG. 1A—PRIOR ART) and RNNs (FIG. 1B—PRIOR ART), exposing their limitations and the differences from our matching CHAMELEON implementation (See FIG. 2A).

Accordingly, one aspect of the disclosure, referred to as Chip Hierarchical Architecture MachinE Learning Engine Optimizing Nodes (CHAMELEON), utilizes a hub-and-spoke ("wagon wheel" or "star") topology at each layer of a neural network. The Hub at the center is a new type of node, referred to as an H-node. With reference to FIG. 2A, an H-node hub is introduced at each layer, which dramatically simplifies and reduces wire counts for layer-to-layer communications by introducing (through the H-node hub) neuron-to-neuron-in-the-same-layer coordination. Simply put, H(L) collects all the computations (outputs) from the neurons in Layer L and forwards them in bulk over a single wire connection to H(L+1), where L+1 denotes the next layer after L, which distributes them as inputs to the neurons in Layer L+1. This exploits the fundamental fact that the output of Layer L is the input of Layer L+1.

In CHAMELEON, neurons, which we call N-nodes, in a layer are actively connected (typically full-duplex) to that layer's Hub center, and this Hub center H-node is actively connected in simplex (half-duplex with no line turnaround ever needed) to the Hub center H-node of the next layer in a Feed Forward neural net, and in an RNN actively connected as well to H-nodes at levels below the next level (including connecting to itself) as the RNN design dictates. As noted, CHAMELEON is an adaptation able to be utilized to improve both FNN and RNN models.

As an alternative, Hub-to-neuron connections in a given layer can be half-duplex, which reduces wires needed in the circuit at the expense of using clock cycles to implement line turn-arounds instead of reading the next input data instance, but in some applications, the input data rate may be such that this is a better choice.

Additional aspects of the disclosure relate to System-on-a-Chip (SoC) AI/ML hardware. Specifically, the disclosure allows for full implementations and on-the-fly modifications of important machine learning inference applications. This includes the running and optionally run-time adapting of already-estimated machine learning models, continuously on newly-arriving data as it is presented to the model.

One aspect of the disclosure is directed to a digital circuit implementing a neural network inference engine. A digital circuit can be implemented in pure hardware and/or as a combination of hardware and software. In one embodiment, the digital circuit is a SoC. The digital circuit includes multiple layers of a neural network; the layers including at least a first layer, a second layer, and a third layer (for ease of exposition we consider only three layers in the following explanation). The digital circuit also includes neurons in a first neuron set, a second neuron set, and a third neuron set. The first neuron set is in the first layer. The second neuron set is in the second layer. The third neuron set is in the third layer. The digital circuit includes a set of hub nodes including a first hub node, a second hub node, and a third hub node. The first neuron set is not directly connected to any of the neurons in the second neuron set and the second neuron set is not directly connected to any of the neurons in the third neuron set. Neurons in the first neuron set are only connected to the first hub node. Neurons in the second neuron set are only connected to the second hub node. Neurons in the third neuron set are only connected to the third hub node. All data transfer between and among the layers takes place hub-to-hub, such that data transfers between the first layer and the second layer occur between the first hub node and the second hub node and data transfers between the second layer and the third layer occur between the second hub node and the third hub node. The first hub node provides the first set of neurons with all the data needed by the first set of neurons to perform respective computations within the neural network. The second hub node provides the second set of neurons with all the data needed by the second set of neurons to perform respective computations within the neural network. The third hub node provides the third set of neurons with all the data needed by the third set of neurons to perform respective computations within the neural network.

The advantages and objects of the disclosure are many. Our invention is generally used after initial model AI/ML training and tuning occurs. It features a near-universal AI/ML inference engine, one that can run ("execute") almost any type of neural network (or even a decision tree model as explained later) on complex, real-world data, supporting multiple instances and ensembles, one that can run in the cloud, be replicated many times in a data center (one engine per server, for example), or installed at the "edge". The disclosure enables engineering that dramatically lowers power consumption, reduces operational costs, speeds execution time, and lowers manufacturing costs (via wire count and wire length reduction, plus circuit module proximity and parallel computing). In one embodiment, procedures automatically report errors, track prediction-accuracy from feedback, flag problems that result from input data distribution changes, and respond adaptively (even on a non-field-programmable ASIC) by adjusting the model in real-time (for a quick fix) without human intervention and without halting work on newly-arriving inference instances, while simultaneously sending telemetry data upstream to servers for more intensive analysis and remediation. Our disclosure permits implementation designs that do not require FPGAs, but allow full flexibility, expansion, adaptations, and modifications while running on an ASIC, via simple parameter loading without code changes. New parameters can come from scheduled, continuous, or ad-hoc downloads from remote (possibly in the cloud) servers. Note that, with current-state-of-the-art implementations, ASICs run only one model type, and are immutable, having none of this flexibility.

In one embodiment, an AI/ML model compiler and loader can distill and optimize the model specifically for various choices of target hardware, saving manual time and effort. Flexible topologies are enabled, allowing multiple configuration sizes tied to manufacturing costs and price-points across the product line, supporting module-by-module choice of parallel (for faster execution) or serial computing, depending on input data rates and hardware. The disclosure permits advanced data handling and run-time monitoring, supporting real-time continuous (streaming) input sets (encompassing numeric, categorical, ordinal, audio, video, images, and text, including fast on-the-fly vectorization of text chunks via Large Language Model Embeddings, known as LLM-embeddings), plus internal tracking and decision-making to trigger early termination of an inference when an estimated accuracy threshold has been met before the model run completes.

DESCRIPTION OF THE PREFERRED EMBODIMENTS

Figure 1:
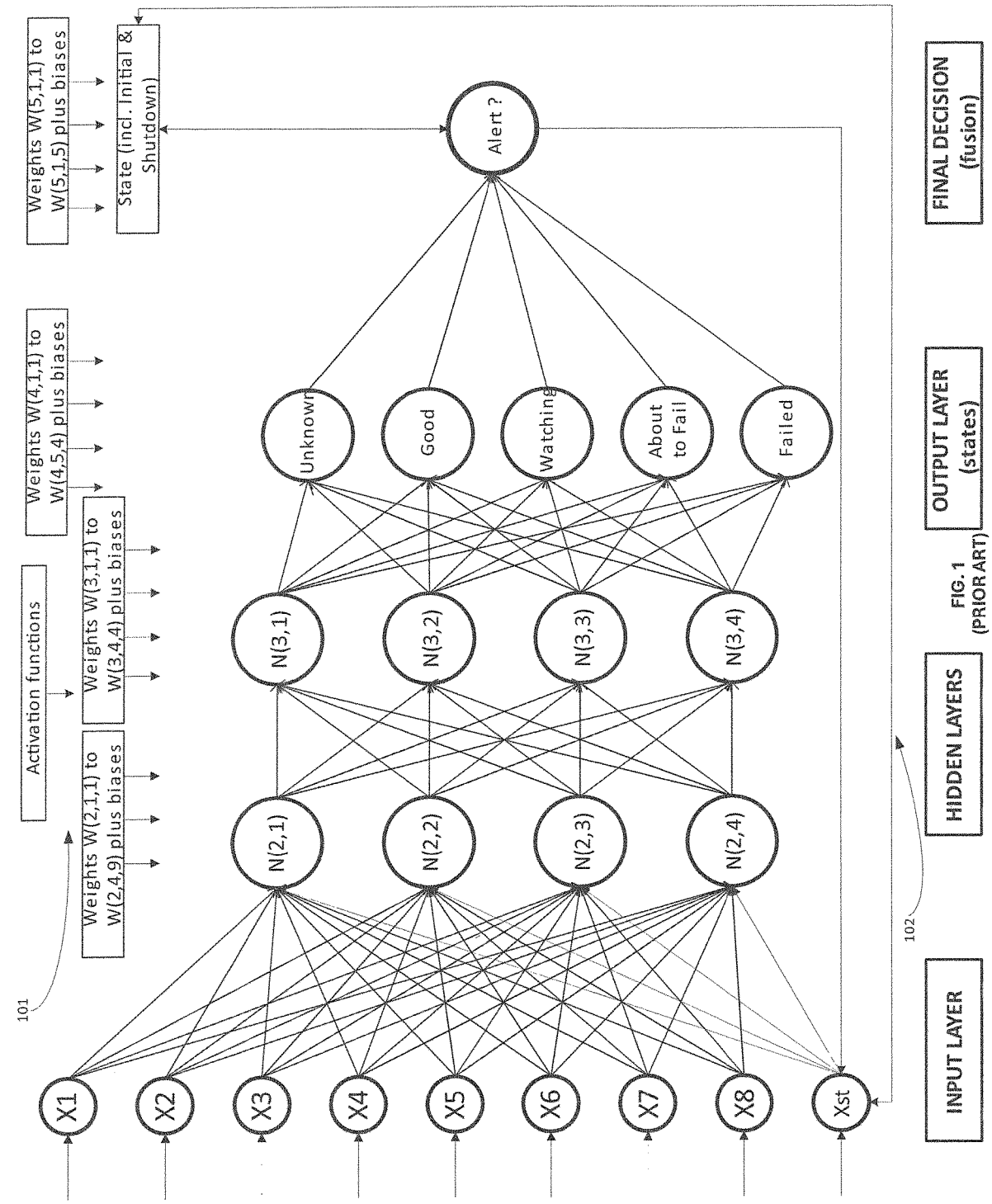
FIG. 1 (PRIOR ART) shows a standard feed-forward neural network, with two hidden layers (four neurons per layer), for predicting state changes.

The preferred embodiments of the present invention will now be described with reference to the drawings. Identical elements in the various figures may be identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Aspects of the machine described herein are designed to allow full implementations and on-the-fly modifications of important machine learning inference applications. This includes the running and optionally run-time adaptation as well as modifications and expansions of already-estimated machine learning models, continuously as newly arriving data is presented to the model. This also includes optional detecting, and optionally signaling, the need for such adaptations, modifications, and expansions, based on accuracy measurements when real-world results are available for comparison to the machine's output (typically predictions) as well as observed changes in the input data distribution that appears, or is statistically verified, as significant. (Sets of input data and the corresponding real-world results can also be used to construct "gold standards" for further model training.) The machine handles models in use in industry today, in substantial generality and with very few size constraints. In particular, it handles single instances and ensembles of real-time responsive machine-learning inference engines consisting of feed-forward deep neural networks, deep recurrent neural networks (RNNs), deep convolutional neural networks (CNNs), and/or decision trees (including boosted trees and ensembles of trees), in arbitrary and optionally mixed configurations. It also handles less-used models like Hopfield networks and Adaptive Resonance Theory (ART) networks, and newer "experimental"

models not yet in general use, like Kolmogorov-Arnold Networks (KAN). In fact, any arrangement of interconnected neurons with input processing (simple arithmetic operations on input values) at each neuron, and forwarding of the results to other neurons, can be handled.

Feed-Forward, RNNs, CNNs, and Decision Trees cover the vast majority of actually-used machine learning techniques, but in fact, our invention is flexible enough to also run more esoteric multi-instance models: Federated, Cooperating, Adversarial, and Swarm collections (where each instance might be distributed on various inference engine platforms, or even all running locally on our SoC).

Model estimation, and crucially model updating, is typically done on large computers customarily deployed off-site in organizational data centers, or in the cloud, not necessarily close to the inference engine hardware. This leads to difficulties in scheduling model updates. Our invention solves this problem, and introduces a stable, robust solution (the HURRI protocol) to the engineering state-of-the-art. In addition to HURRI, which handles external-computer communications to our machine, our machine can also communicate operational details and results, as well as uploading "gold standard" data it has derived, back to the external-computer.

The invention is widely applicable. It is particularly well-suited for both prediction and control of state-changes in multi-stage, multi-use, and multi-tenant operations, including finite-state machines and generalizations thereof. We use state-change-prediction applications as expository examples in this filing. Note that most real-world running operational systems, whether in a data center or at the edge, record and often report their current state or state-change; when our machine can tap into these state-or-state-change records, which would be straightforward when such records are externally reported, our machine's capability to measure and react to observed prediction accuracy comes into play, as does our machine further reporting on this, thus participating in a closed-loop system that is robust, perhaps even impervious, or at least resistant, to unexpected real-world changes and shocks, and resilient to their potentially deleterious effects.

Specific examples of state-change-predictive applications are real-time telephony, call-center, and computer network systems-monitoring using diagnostic signal processing machines for extraction of, and alerting on, changes to system status, separating signal from noise, via the ingestion of rapidly-arriving system message packets, individually containing or combining numeric, categorical, ordinal, text, image, audio, and video data. Such message packets are generated simultaneously and continuously, reported via telemetry or streaming transmissions from multiple processes, some processes being dependent on other processes while some are fully independent. The message content may reflect routine one-time or periodic status reports, specific events ("triggers"), or ad-hoc reports of unusual or aberrant behavior, system load, or system failure, and inter-mixes of these, with certain messages reflecting some operations and other messages reflecting other operations. Note that not all messages are based on physical events or measurements: a customer complaint, inquiry, or support request expressing frustration, doubt, worry, etc., perhaps with obscenities added (if text), or those properties plus voice-raising/yelling if audio, are significant happenings. Operations may be logically or physically diverse, possibly redundant, with some doing the same processing as others and some doing processing that is unique. Our invention is well-suited to all of these configurations, and in fact is directed at allowing system owners to "get ahead" of system problems. The ability of our invention to capture and store a history of such message events enhances its ability to adapt the inference, and report the situation, as previously discussed.

By instantiating, in a single SoC, multiple instances of the entire neural network, or specific subsets and/or modifications thereof, as well as multiple (different) neural networks, our invention can additionally (beyond the configurations cited above) support the following, integrating with on-board processors as necessary:

Facet-Masking (selectively running the model multiple times, each time leaving out one or more input features, often balancing specific subsets of inputs, to potentially increase accuracy by decreasing signal-corrupting noise).

Time Series Pre-Processing (avoiding the use of RNNs with time series data by augmenting the input data itself with lagged versions [autoregressive] or time-weighted—perhaps self-correcting based on observed errors—averages [exponential smoothing, Kalman filtering, moving-average models] of prior input data, done at the input step, not inside the model itself).

Dense Vector Encoding (turning textual data input into dense numeric vectors called "embeddings" via Large Language Models-known as LLMs-pre-trained, pre-trained-then-fine-tuned, or custom-built-from-scratch, or possibly with more than one LLM creating an ensemble approach; this is particularly powerful when, as part of the input process, individual "chunks" of textual data—of any length—have their actual embedding vectors replaced by each vector's distance to one or more "foundational" vectors, the foundational vectors representing text explaining basic events or conditions) as the input to the machine learning model).

Advanced ensemble techniques for data fusion and stacking, including both weighted averaging and table-driven optimal fusion derived from the theory of monotone Boolean or n-ary functions, or a greedy approximation to the optimal as well as a full second-stage machine learning engine, a "meta-learner", to do the data fusion after "learning."

Runtime chaining of multiple neural network inference engines, which has not been widely adopted in general practice due to conventional difficulties of actually sequentially running multiple neural network inference engines at any particular instance, especially in a real-time data monitoring environment.

Furthermore, apart from the usual approach of employing integer-only arithmetic via quantization, and some spline-based approximation to various activation functions (as discussed below), distillation of the trained model structure will not be necessary if the SoC hardware-component imposed limits on neuron counts (nodes or cells of the circuit) and layer counts (interconnected collections of cells) are met. Importantly, note that the limits themselves can be set arbitrarily high by the SoC manufacturers; in fact, we expect the marketplace to offer "sized" (S, M, L, XL, and XXL) versions of the hardware, enabling application builders to best control their costs by choosing a "right-sized" ASIC or FPGA (with the ASIC implementation expected to be the cost-leader). We call this approach to hardware sizing "STAND-UP": Sized Topology Architecture for New Data and Update Processing.

Even more remarkably, STAND-UP SoCs allow unrestricted changes to weights, biases, activation functions, number of layers, neurons-per-layer, and placement (addition and deletion) of recurrent feedback connections without re-programming, accomplishing this with a fast data-load step (expected to be only a few milliseconds in most cases) controlled by the HURRI protocol.

In the disclosure, Chip Hierarchical Architecture MachinE Learning Engine Optimizing Nodes (CHAMELEON) is based on the use of a hub-and-spoke ("wagon wheel" or "star") topology at each layer of a neural network. The Hub at the center is a new type of node, referred to as an H-node. CHAMELEON results in substantial savings in wires, which translates into lower manufacturing costs and lower power requirements as elaborated upon herein.

Figure 3A:
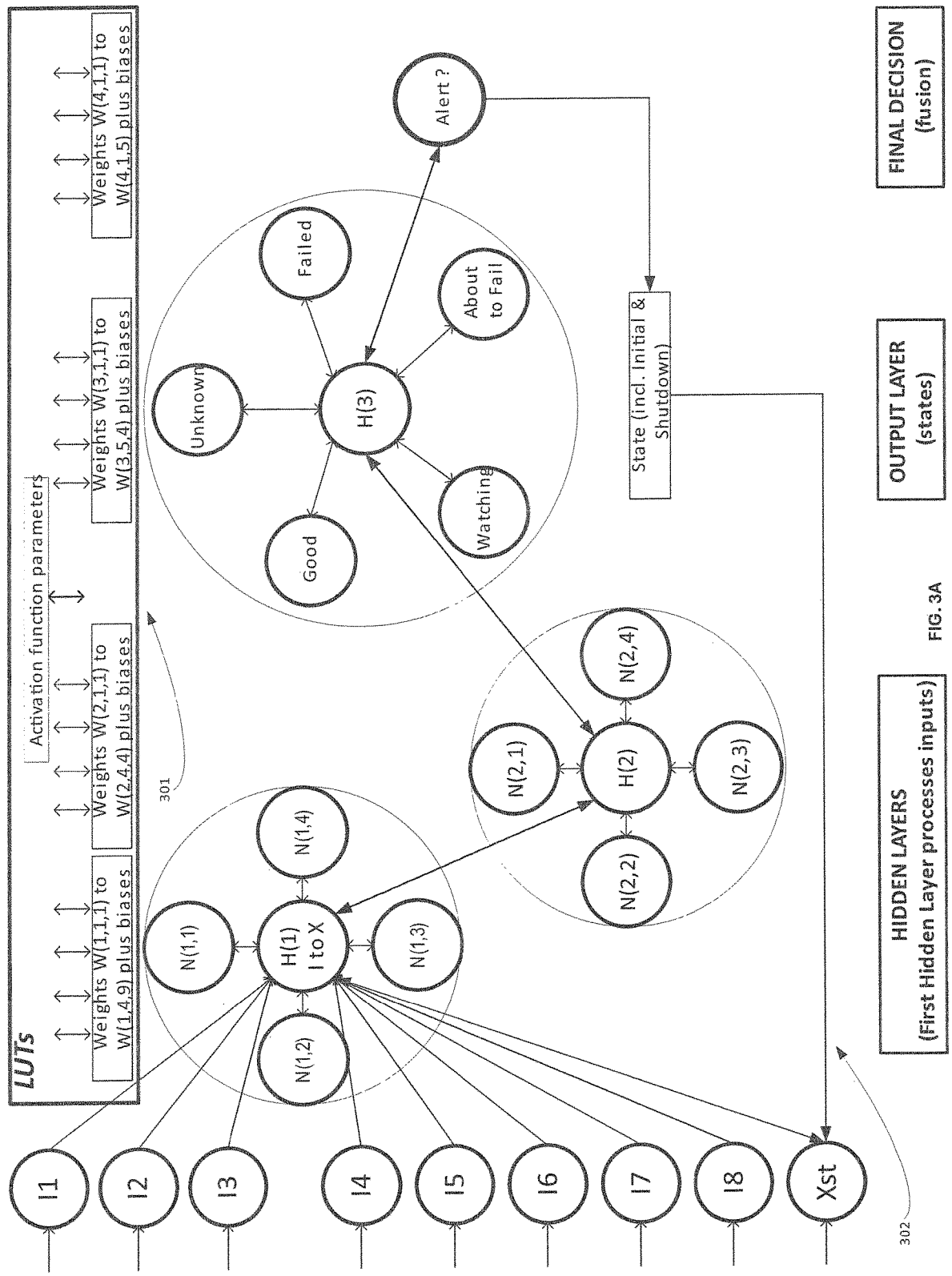
FIG. 3A shows a neural network corresponding to that of FIG. 1 and FIG. 2 other than using an H-node, according to at least some embodiments disclosed herein.

With reference to FIG. 3A, a CHAMELEON hub-and-spoke architecture is shown in accordance with embodiments of the disclosure. FIG. 3A is for a TELCO and is functionally equivalent to the FNN of FIG. 1A (PRIOR ART) and the RNN of FIG. 1B. Accordingly, input 201 and 202 are used to process inputs and state changes.

H(L) collects all the computations (outputs) from the neurons in Layer L and forwards them in bulk over a single wire connection to H(L+1), where L+1 denotes the next layer after L, which distributes them as inputs to the neurons in Layer L+1 . . . exploiting the fundamental fact of standard neural networks (FFs, RNNs, and convolutional neural networks (CNNs) that the output of Layer L is the input to Layer L+1.

Furthermore, the introduction of H(1), the first H-node Hub, gives us the option to use the processing capabilities of a limited-power central processing unit (CPU) included in H(1) to prepare the input values X from raw informational data we denote by the capital letter I (for example, word embeddings to replace text with numeric vectors or time-series transformations like first-differences, both discussed above), and even if the mapping from I to X is trivial or even non-existent (in the sense that no further processing of raw I values is needed to form the model-input X values), the use of H(1) in this way eliminates the input layer totally.

Observe that, in situations where the data rate is not pushing the model to its processing limit, some optimization exploits to "save the time it takes to handle a level" are possible. For example, when H(1) hands off all the data it has collected from neurons in its level to H(2) (and H(2) then hands them to its neurons in level 2), H(1) may well have the processing time necessary to transform the next set of I values to the corresponding X values, distribute them to the neurons in Level 1, collect all the neuron outputs, and be prepared to transmit these to H(2) before H(2) has finished the prior batch of outputs from Level 1 that serve as the current inputs H(2) and its neurons are working on. This saves the time it takes to process a level. This same speed-up could potentially be used between any level L and level L+1, for some or all levels.

Figure 2:
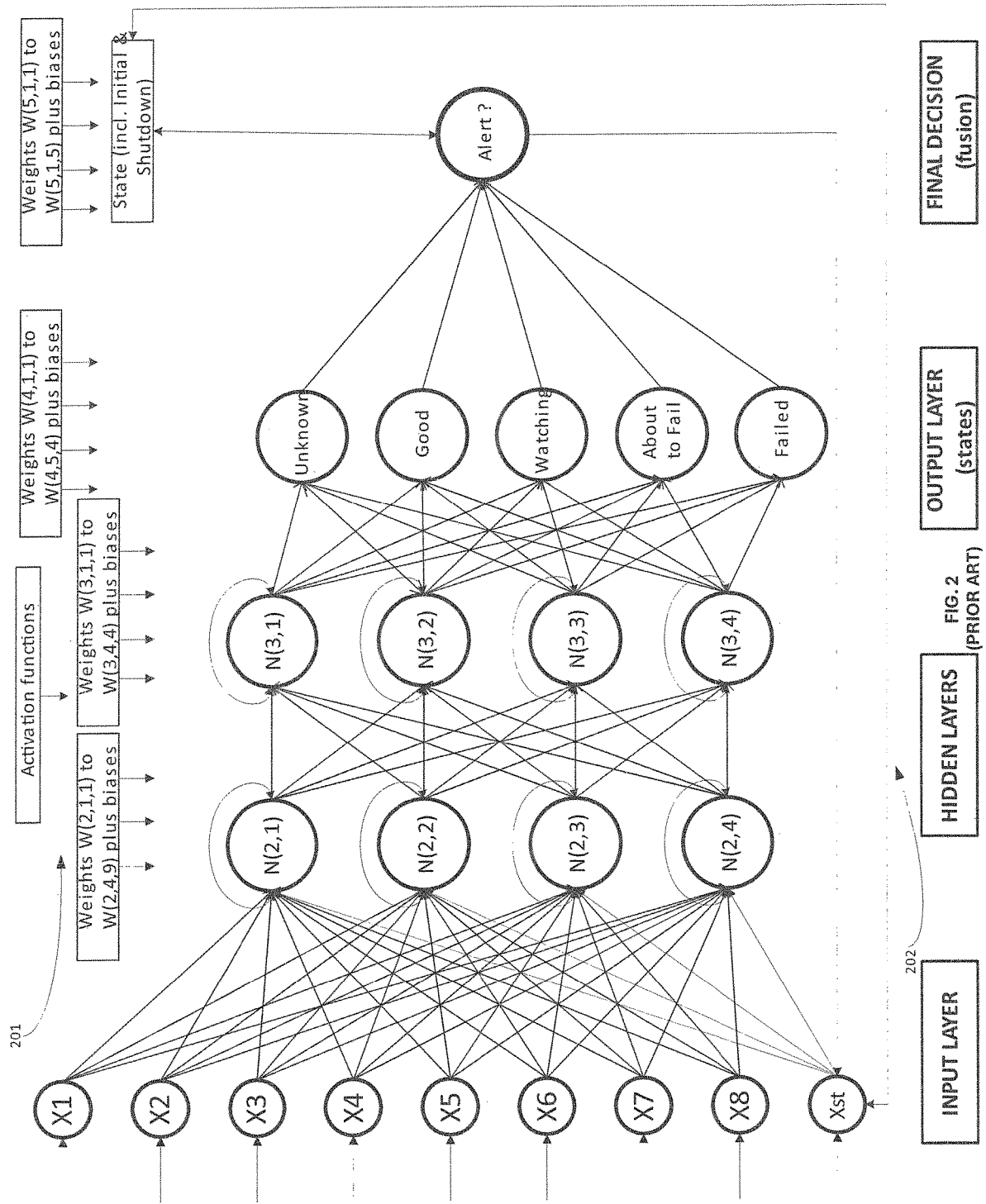
FIG. 2 (PRIOR ART) shows a standard recurrent neural network, with two hidden layers (four neurons per layer), for predicting state changes.

One notable advantage of CHAMELEON (as shown with reference to FIG. 2A) is that hub-to-hub communications can be two-way, either with full-duplex (2-wire connections) or half-duplex (one wire with some processing consumed to "turn around" the communications line). Therefore the looping-back of computational results via data transmissions that form an essential part of RNNs can be handled simply and directly (with far fewer wires) by sending data directly from H(L) to H(L−1), where L−1 denotes the previous layer to L. If the loop-back is only to neurons in the same layer, no actual loop-back transmission would be needed at all, as the hub just retains the necessary values. In other words, one architecture and wiring plan handles both feed-forward and recurrent neural networks, which is a major advance. Furthermore, even in the cases where hubs H(L) and H(L−1) have to communicate to fulfill the computations required by an RNN, the original transmission of data from H(L−1) to H(L) has been fully completed already in many instances, allowing the processing of a half-duplex line-turnaround to not cause any time delay (because the time consumed in the line-turnaround would be Hub idle time anyway). Architectures are disclosed that allow any Hub to communicate with any other Hub, not just those that are one level away, which further accelerates the processing needed in some RNN models.

Introducing the H-node Hub at each layer dramatically simplifies and reduces wire counts for layer-to-layer communications by introducing neuron-to-neuron-in-the-same-layer coordination (through the H-node Hub). The savings in wires, and therefore both in cost of manufacturing and in power requirement, are substantial. The following table illustrates the wire count reduction for an example Feed Forward (FF) network with 8 inputs, an Input Layer, two hidden layers, an Output Layer, and a final Action ("Alert") Layer that processes the output of the current data-instance inference; both full- and half-duplex configurations are shown in the table. A reduction in total node-interconnect wires from 73 for a traditional Feed Forward Network (see FIG. 1A PRIOR ART) with one input layer to 37. This 37 can be reduced to 24 if half-duplex connections are used from Hub-to-neurons (H-node to N-nodes), with some increase in processing time due to line-turnaround delays. In some applications this cost vs time trade-off is beneficial.

| Elements | Count |
| --- | --- |
| Input Layer-Data Signal Lines | 8 |
| Hidden Layer 1 Neurons | 4 |
| Hidden Layer 2 Neurons | 4 |
| Output Layer: Decision Points | 5 |

| | | | Total Wire | |
| --- | --- | --- | --- | --- |
| Alert Module: | 1 | | | |
| | Duplex Type | Wire Count Calculation | Count | Notes |
| Traditional FF NN (SEE FIG. 1A) | Half Duplex (no turnaround required) | =(8 * 4) + (4 * 4) + (4 * 5) + (5 * 1) | 73 | |
| CHAMELEON FF NN (SEE FIG. 2A) | Full Duplex (Hub to Neurons each Layer) | =(8 * 1) + (2 * 4) + (1 * 1) + (2 * 4) + (1 * 1) + (2 * 5) + (1 * 1) | 37 | |

| Alert Module: | | 1 | | Total Wire | |
|---|---|---|---|---|---|
| | Duplex Type | Wire Count Calculation | | Count | Notes |
| CHAMELEON FF NN (SEE FIG. 2A) | Half Duplex (Hub to Neurons each Layer) | =(8 * 1) + (1 * 4) + (1 * 1) + (1 * 4) + (1 * 1) + (1 * 5) + (1 * 1) | | 24 | Turnaround on 4 + 4 + 5 = 13 connections (Hub to Neuron connections) |

Additional optimization that uses the first H-node is possible. There, the Hub for the first Hidden Layer is used to process the input data when it arrives, thereby eliminating the need for the Input Layer entirely. This reduces the 37 to 29 and the 24 to 16 (a reduction of 8 wires in both cases). In applications with lower data volumes, this optimization can be beneficial, since the only cost is not being able to handle the "next" input set that arrives immediately if the first Hidden Layer is not done yet handling the previous input set.

In a further optimization, manufacturers of the SoC can group the layers (each layer with a Hub H-node and several N-node neurons) into close-proximity ("neighborhoods") on the circuit board to keep hub-to-hub (layer-to-layer), as well as RNN feedback connections when such connections are required, as short as possible. Various pre-configured neighborhood layouts can be offered in the manufacturer's product lines.

Note that a key here is the concept of "active" connections; depending on how the SoC is manufactured, there may well be wires in a given layer that are not used in a particular model configuration (more N-nodes in that layer, each connected to the H-node Hub, than neurons actually used; such unused neurons will be loaded with zero weights, as discussed in more detail below). These excess unused neurons might simply be present due to the manufacturer offering a selection of "standard sizes" of the SoC (per STAND-UP concept). The excess neurons do no harm and do not take up any processing time. Furthermore, should the model change, the SoC is able to be reconfigured without programming by changing parameters. The previously unused neurons can be used depending on the parameter change.

Because hubs now manage all data input/output to neurons, and because Hub nodes can be manufactured with additional processing capabilities via the inclusion of a limited-power CPU when compared to neuron nodes (there are far fewer hubs than neurons, making the expense of extra processing power quite manageable), the processing of inputs shown in inputs 301 (as opposed to inputs 101 and 201) can be more robust, since additional computing power is available, and therefore the weights and biases can be stored in (one or more) Look-Up Tables (LUTs)—as diagrammed—and "pulled" by hubs for retrieval instead of being individually pushed to neurons, a potentially major savings in time-to-execute. Hub-to-LUT connections are explicitly shown in FIG. 3B.

As shown in inputs 301, the communications arrows are now two-way, illustrating that not only does basic information on the neural network structure and parameter values flow into the device, but information on the network structure and values can flow back out. (This is true of all further FIGs, but we do not show the double-headed two-way arrows in further diagrams so as not to confuse the basic principles being communicated in those FIGs.) Assume that it is an external central computer, possibly in the cloud, submitting the model structure and parameter values to our machine (as discussed earlier). Now the machine itself can communicate these values, potentially altered as our machine runs, back to the external central computer. Also, other values, such as inputs, and other operating values, can also be communicated back for diagnostic, remediation, and improvement purposes. But there is an additional use for two-way communications: the central computer, after receiving information on structure and values, could actually run a software simulation of what the hardware is doing, in fact, an exact simulation if input values are also communicated, or otherwise shared between our machine and the central computer (perhaps by simultaneous transmission from the source), thus allowing the central computer to precisely emulate the hardware and improve it (communicating those improvements to be incorporated as illustrated below), in real-time or in batch scheduled times (for both the inputs, the outputs, and the simulations, which can each be real-time or batch scheduled, in any combination).

Figure 3B:
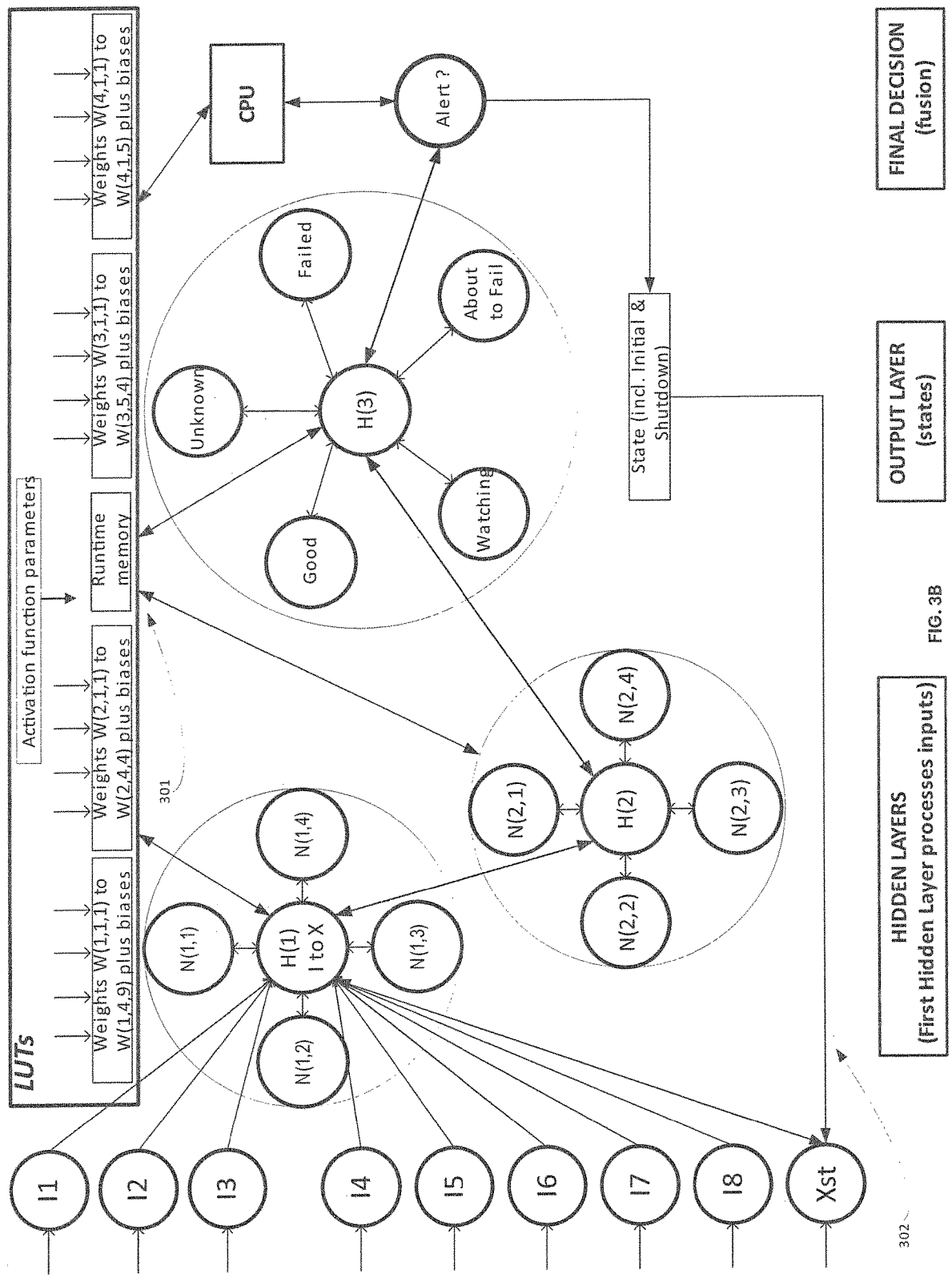
FIG. 3B shows an optional enhancement to the structure shown in FIG. 3A, which adds shared memory, according to at least some embodiments disclosed herein.

With reference to FIG. 3B, inputs 301 and 302 are again shown, but global shared runtime memory can, as an option, be installed and used instead of being reliant on hub-to-hub communications wiring (see FIG. 3A) for at least some of the hub-to-hub messaging. This approach may utilize additional runtime memory that is able to be shared by all the hubs and the hub-to-hub wiring. Additionally, a more powerful CPU may be included to provide additional computing power to assist in the decision to generate an Alert, and to process/communicate the Alert if it is in fact generated. Options of FIG. 3B may increase expenses over those of FIG. 3A to increase processing speed. Different manufacturers may prefer one approach over the other depending on their cost sensitivity and the performance needs of their customers.

Figure 3C:
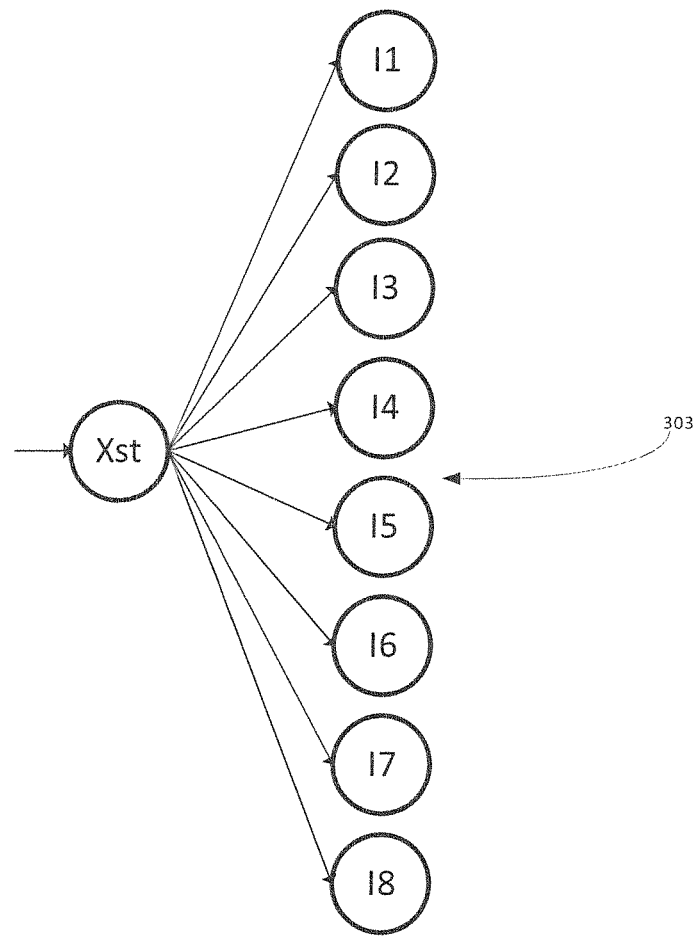
FIG. 3C shows a variation of FIG. 3B where the processing at the Xst node handles preparation of model inputs from the data instance presented for inference, according to at least some embodiments disclosed herein.

With reference to FIG. 3C, the node Xst that manages the collection and forwarding of the system-being-monitored state variable can be designed with enough computing power to handle the processing of the inputs 303. Accordingly, FIG. 3C is an alternative to having the first (hidden layer) hub handle the chores (transformation and conversion of I values to X values) of the input layer, as illustrated in FIG. 3B.

Figure 3D:
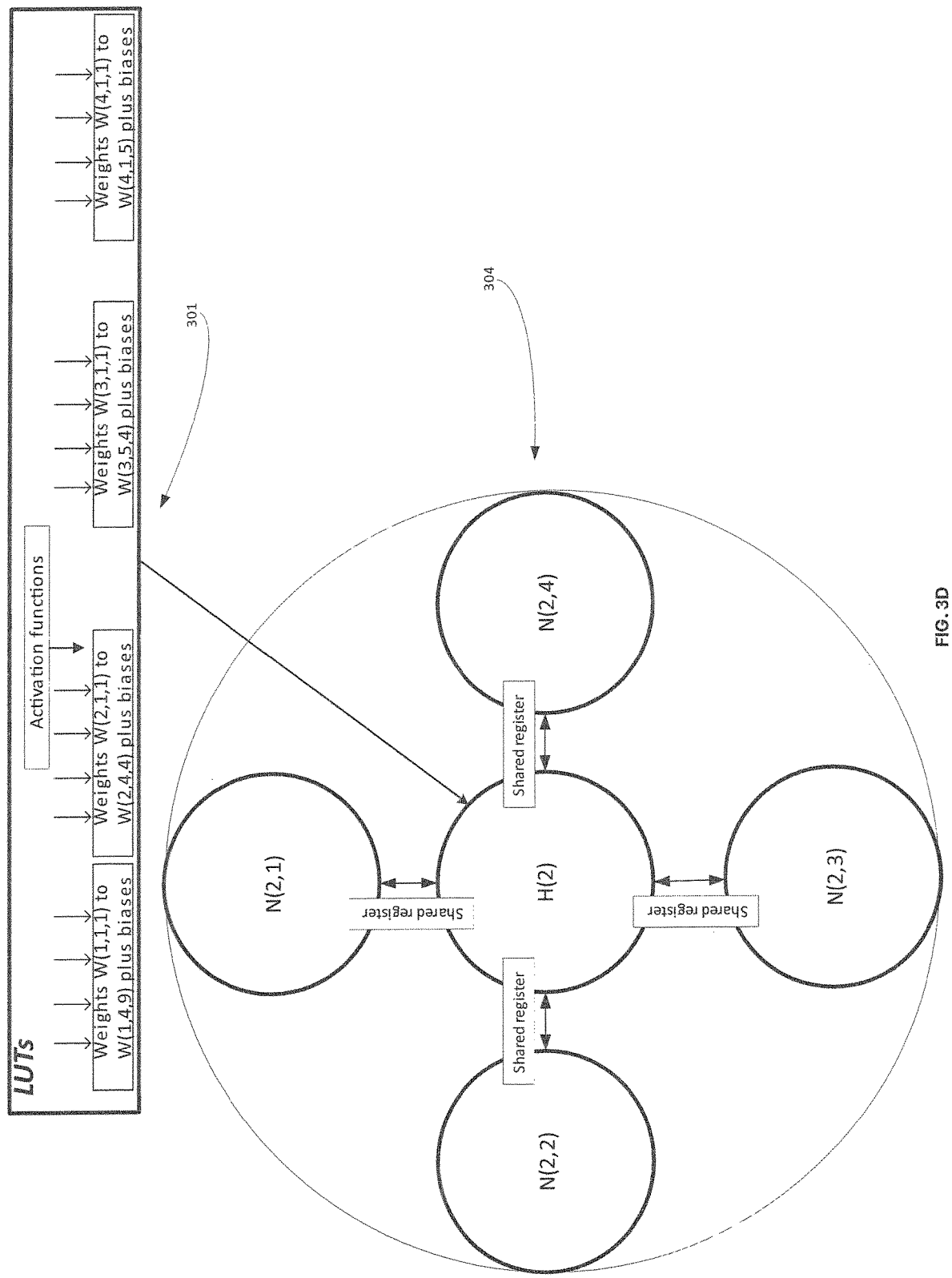
FIG. 3D shows a detailed view of a hub exhibiting further wire savings and potentially better execution time utilization at the hub by employing shared memory registers, according to at least some embodiments disclosed herein.
Figure 4:
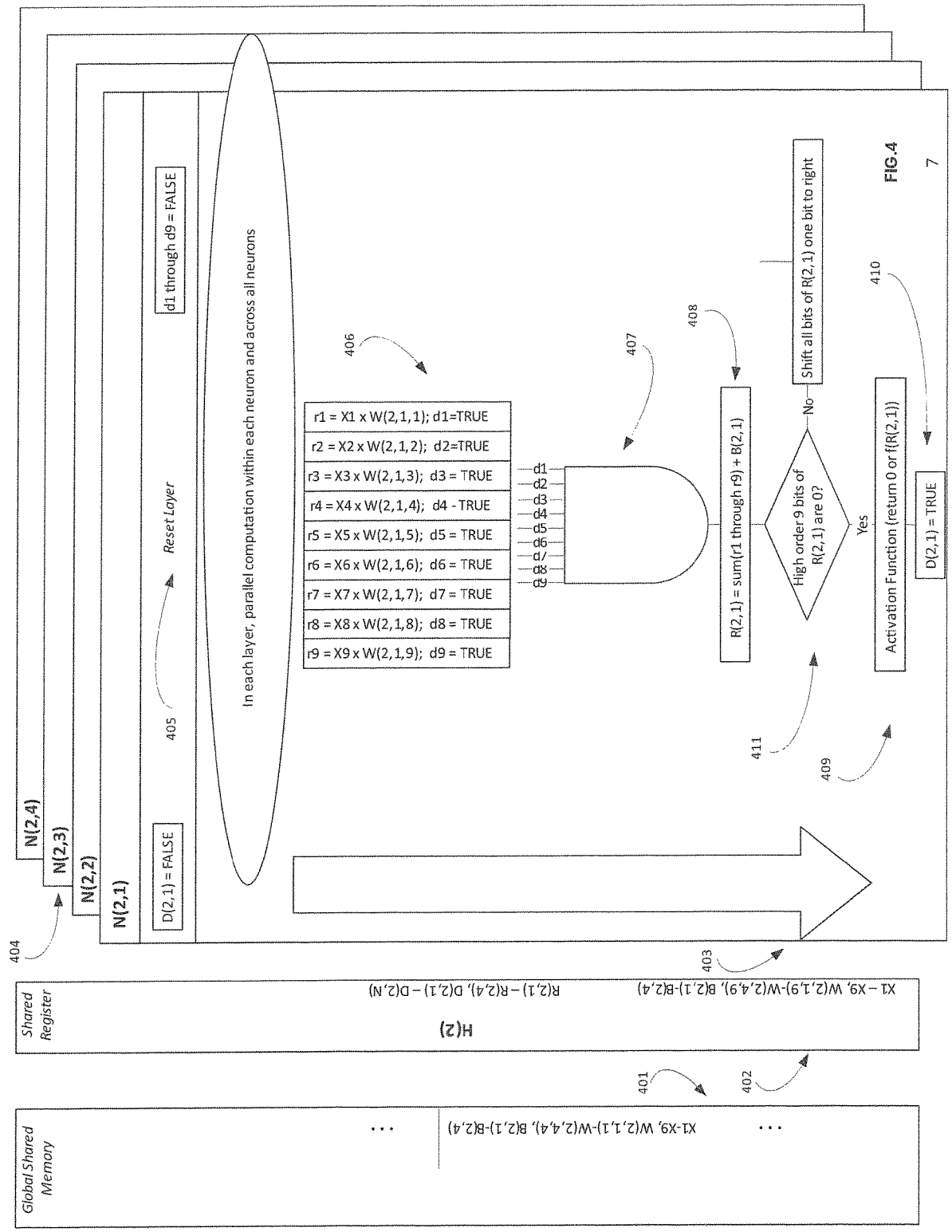
FIG. 4 shows a wiring diagram of a hub with 4 neurons, according to at least some embodiments disclosed herein.

With reference to FIG. 3D, hub-neuron (2-way) communications can also be implemented via a set of shared registers 304, one shared register for each hub-neuron communication As with hub-to-hub communications described, use of shared registers can increase manufacturing expense but can speed up processing.

Parallel computation, both within each neuron (as each input variable is multiplied by its weight), and across all neurons (doing the neuron calculation for all such neurons connected to a single Hub at once) is shown in FIGS. 4—404, 406, and 407, followed by the summation, adding of bias, and application of the activation function in series (not in parallel) for a single neuron but still in parallel across all neurons 408, 409, 410, and 411. Input data and all parameters are shown being loaded 402, and 403 indicates the flow of processing. 401 shows the optional connection to global shared memory, as explained previously. 411 also shows how our circuit guards against computer-word overflow during the summation process. Note that with parallel processing no time is lost for multiplying by zero for a particular variable, so no test for 0-weights needs to be made; setting some weights to zero, either as a permanent part of the model, or as a dynamic adjustment to the model as discussed, is an important and powerful technique to optimize machine learning model performance by suppressing the influence of inputs that are irrelevant in certain layers or neurons. 405 illustrates how processing at this neuron, and similarly at all neurons, can be temporarily disabled in response to a signal to do so that is part of the HURRI protocol.

Figure 5:
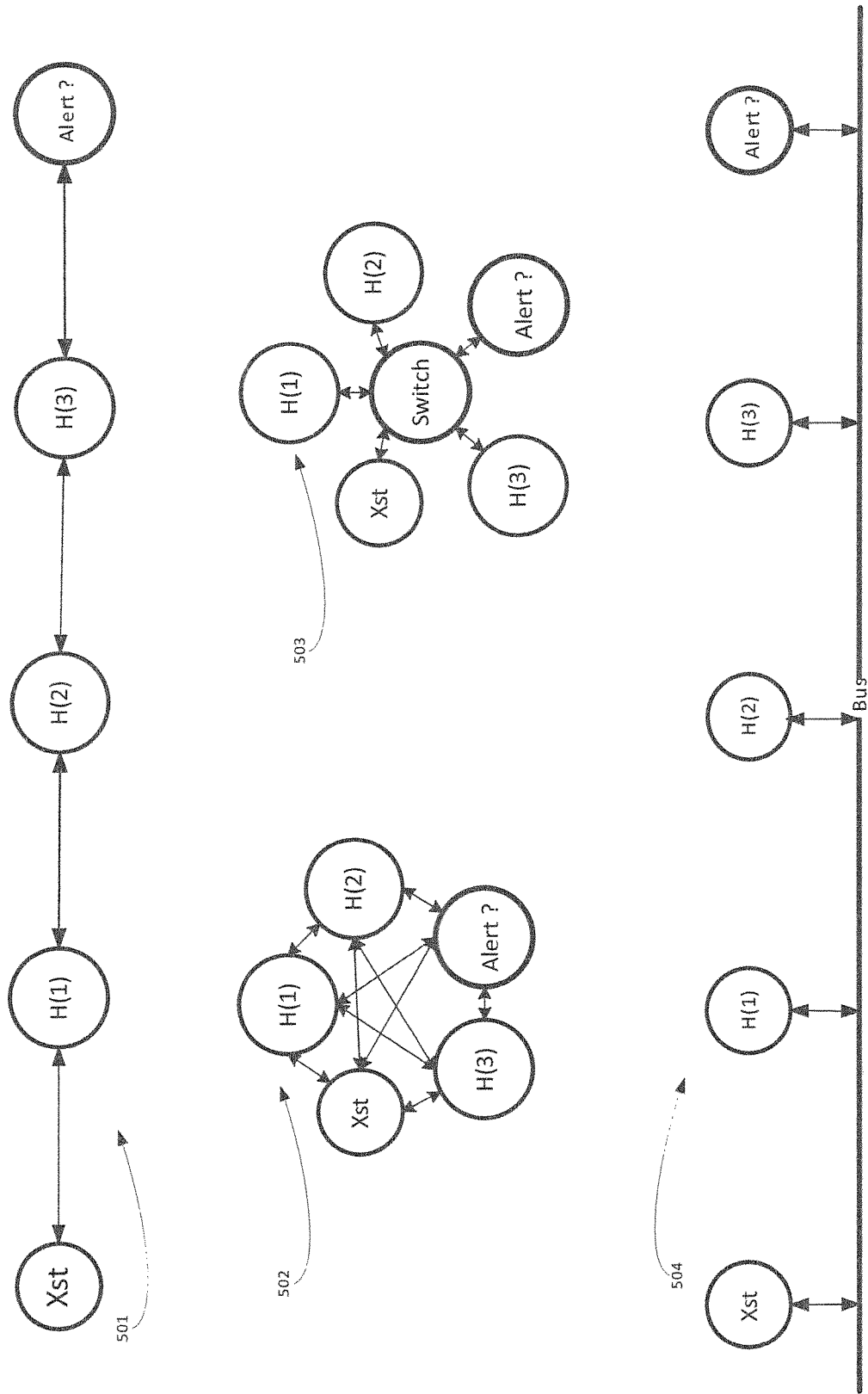
FIG. 5 shows alternate topologies for connecting hubs, according to at least some embodiments disclosed herein.

FIG. 5 shows the options for different Hub wiring interconnect topologies (hub-to-hub wiring itself being an alternative or supplement to hub-to-hub communications via global shared memory, as discussed above). Point-to-Point sequential communication (with the option for forwarding on communications intended for a subsequent Hub if called for) is shown in 501, Direct all-pairs interconnect (called a "star") is shown in 502, a central switch topology (less sophisticated circuitry than shared global memory) is shown in 503, and a true message bus is shown in 504. hub-to-hub communications is an important design variable to adjust for varying applications, and manufacturers can make a variety of options available. Note also that FIG. 5 covers communications from the State Variable Xst to the first Hub, and communications from the final Hub to the Alert Decision Layer as part of the hub-to-hub communications topology, since Xst and the Alert Decision Layer play the same conceptual role as a Hub.

The timing requirements of hub-to-hub communications can be taken into account by manufacturers when configuring versions of our invention. In the parallel computing configurations discussed above, observe that in the traditional all-neurons-in-a-layer fully connected to all-neurons-in-the-next-layer, FIG. 1 (PRIOR ART), the transition from one layer to the next can take place in one clock-cycle-per-bit, while with our Hub topology and wiring, 3 clock-cycles-per bit are used (neurons-to-Hub in one layer, then hub-to-hub, then Hub-to-neurons in the next layer). But this is not a defect of our invention, since we are emphasizing the optimization of wire count and logic density, which are the drivers of fabrication cost and power consumption, which are the real keys to efficiency and practicality, not necessarily eliminating as many picoseconds as possible (which might not even matter in many applications). Furthermore, as described herein, shared registers, while costing more, can dramatically speed up neuron-Hub communications, and with traditional fully connected (no hubs) topology, the number of such registers would be prohibitive from a cost and power standpoint (but not so with our Hub approach), which means our invention might actually have the time advantage despite layer-to-layer transition being done in 3 steps. In addition, our signal path is shorter than the traditional design, due to our Hub topology, and that has positive implications for transmission speed, power consumption, and fabrication costs, especially since active components are often needed when interconnects cross-all crossings in an FPGA are active and that is often true to some degree in an ASIC, depending on the ASIC design.

An additional point with regards to FIG. 5. Each of the Hub interconnect topologies shown can be stacked, iterated, and/or nested with additional copies of itself or other topologies, thus allowing very complex computational networks, like a star-of-stars, or a bus of stars, etc. A tree of individual hubs, a tree of stars, or multiple trees ("forests") like these can also be constructed (and one such example is exhibited later for Decision Trees, FIG. 16).

To amplify the previous point, there are certain types of machine learning models that are not neural networks, and have no neurons, but do have layers of decision making units. Decision Trees and Forests are an example, as just mentioned. Hubs can have the needed processing capabilities via the inclusion of a limited-power CPU to implement these models correctly, and thus our invention is applicable to this type of machine learning as well.

Figure 6:
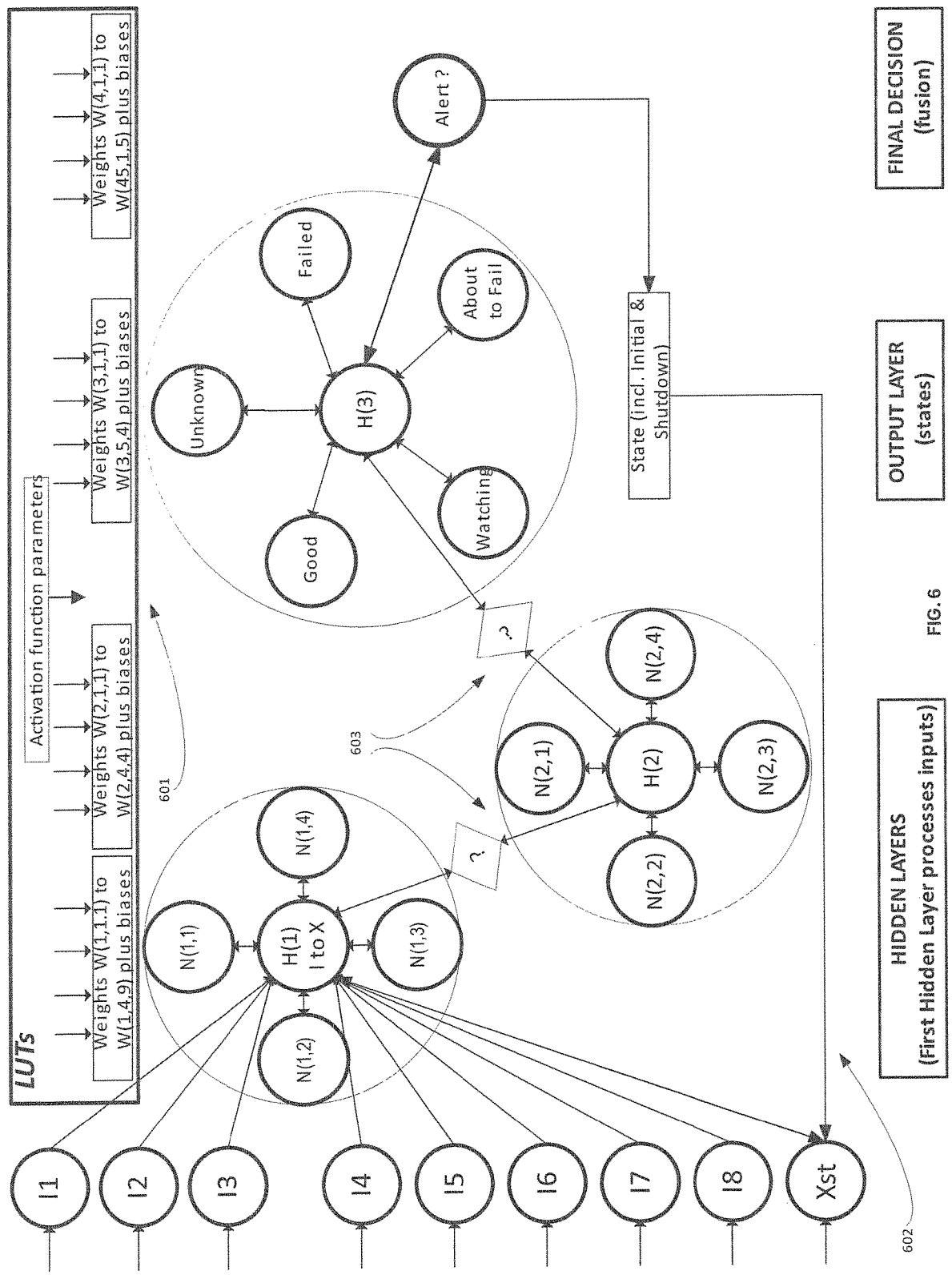
FIG. 6 shows decisions being made (for example) by the first two hubs, according to at least some embodiments disclosed herein.

One of our key innovations is to allow, optionally, hubs to make decisions (via the processing capabilities of an included limited-power CPU) with regards to next-layer-to-process routing (not necessarily always automatically routing to the next sequential layer), thereby implementing jumps (to later layers in the sequence, when the current state of data and the model suggest that is advantageous), early termination of the instance inference (when answers have been determined sooner than usual), and define-by-run modifications to processing. This is shown in FIGS. 6: 601 and 602 are the usual components analogous to 101, 102/201, 202/301, 302, but we introduce 603 to depict logic circuits (which could be CPUs, potentially very limited and low-power CPUs) to make the run-time routing decisions in real-time.

Figure 7A:
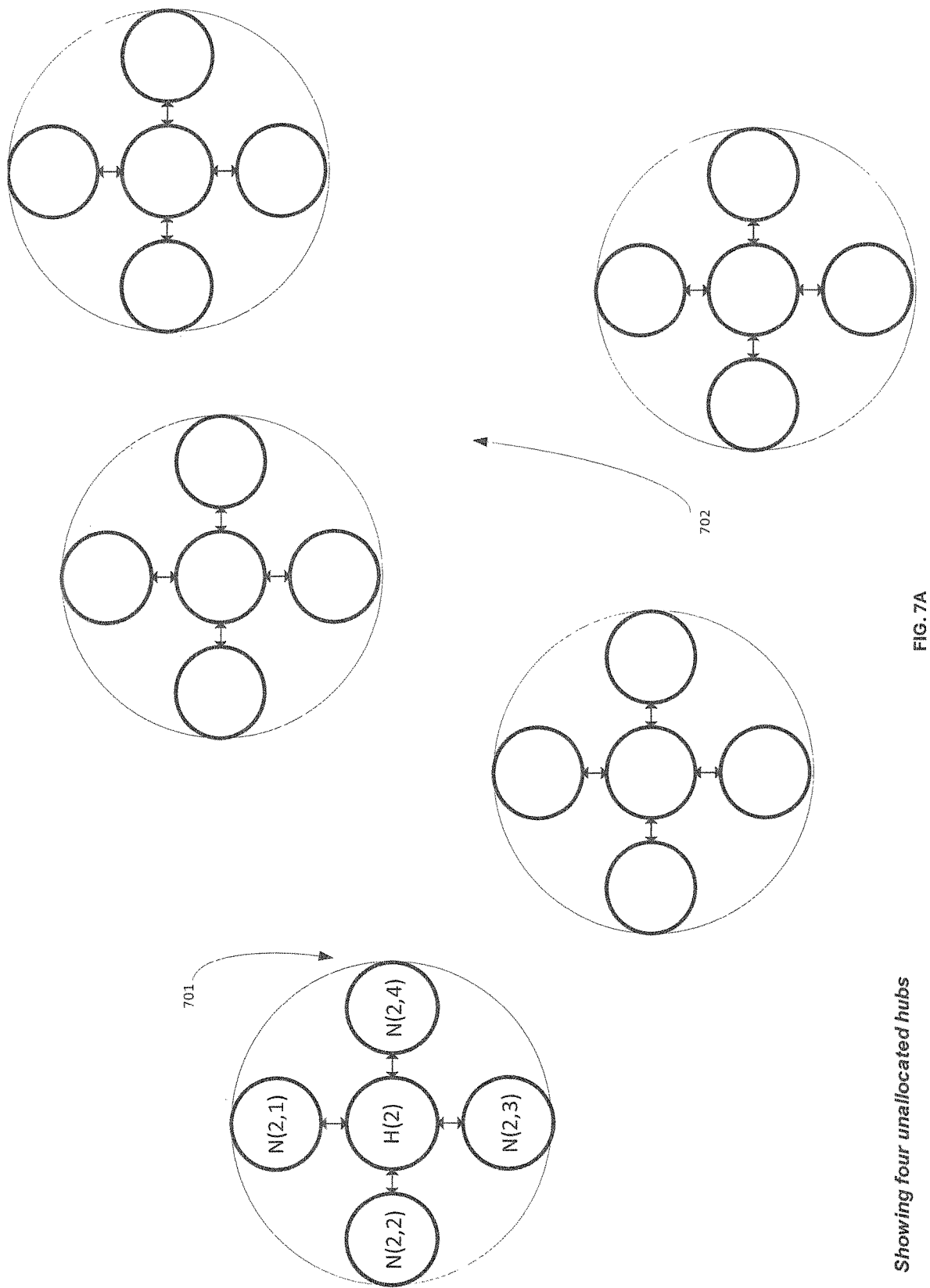
FIG. 7A shows one hub with four neurons in use and four unused spare hubs, according to at least some embodiments disclosed herein.
Figure 7B:
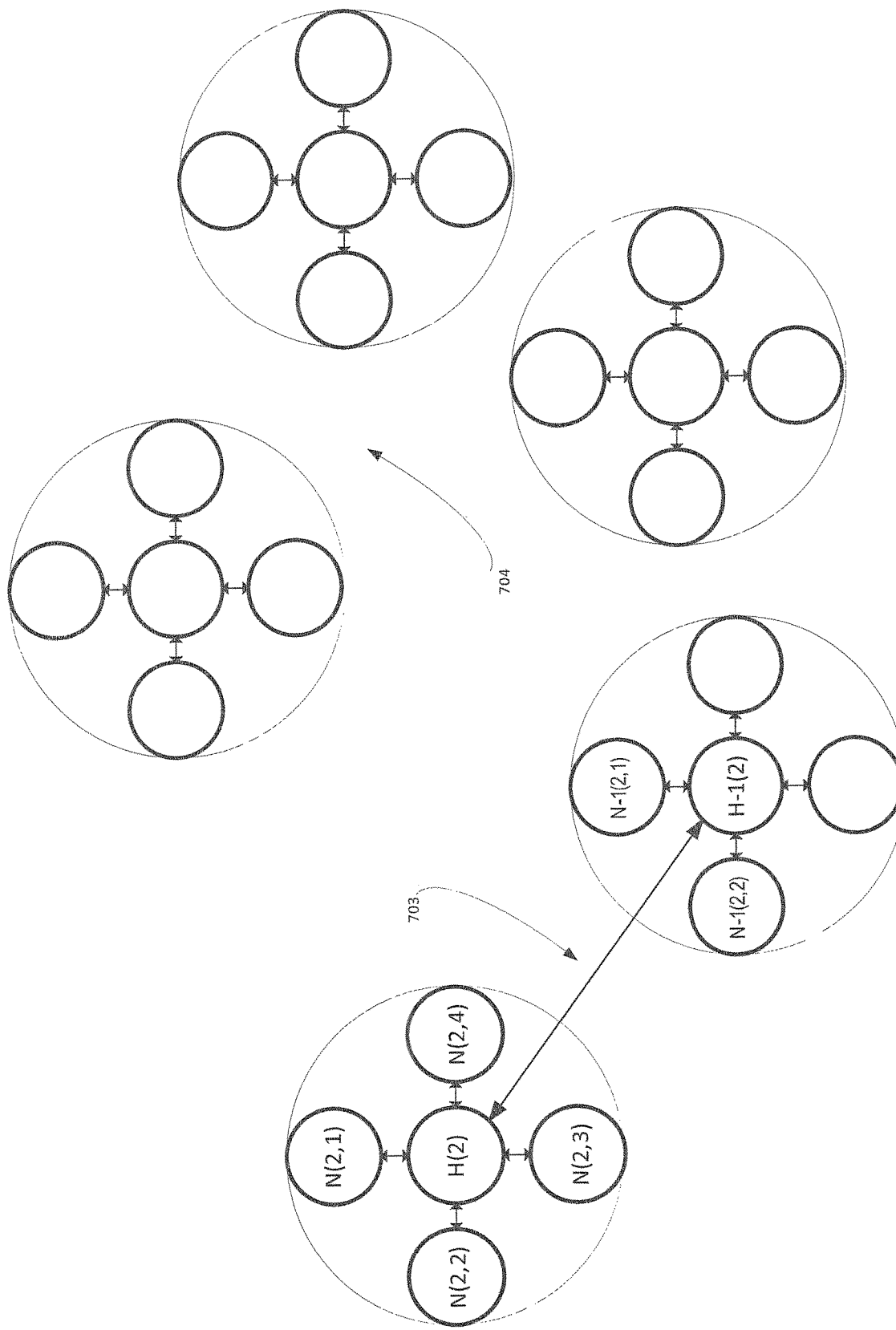
FIG. 7B shows a first hub with four neurons that needs two additional neurons so a spare Hub is turned into a helper Hub, according to at least some embodiments disclosed herein.

FIG. 7A and FIG. 7B show spare hubs (702 in FIG. 7A and 704 in FIG. 7B) and helper hubs (703 in FIG. 7B), important innovations in our invention that are used to augment the processing of a layer's main Hub 701 when necessary due to model updates. As the machine learning model that is being used for inference evolves and is updated in response to triggers (from external or on-board training and/or re-estimation of machine learning models), it might turn out that a layer needs more neurons or the model needs more layers, or both. Building in extra neurons in each layer initially can help but is not a general solution. Instead, our fabrication can have extra unused hubs, each with some number of neurons. This allows an unused Hub to be turned on and become a new layer, but it also allows an unused Hub to be assigned as a helper (a.k.a. slave or extension) Hub for an existing Hub, thereby adding more neurons to the existing Hub.

The helper Hub does nothing but take input from the main Hub, give it to its neurons in the usual way, collect the neurons' outputs, and supply the outputs back to the main Hub. This exactly implements adding neurons to the main Hub. Since the main Hub can communicate to the helper Hub in parallel with its communications to its own neurons, and the helper Hub can communicate to its neurons in parallel while the main Hub neurons are working, only at most two clock ticks (per bit) are added (the helper Hub to its neurons uses one tick, and the helper Hub sending back answers to the main Hub uses the other tick)—and perhaps less time due to possible longer processing times in the main Hub's neurons—a small price to pay for the innovative ability to grow layer "width" (number of neurons in a given layer) dynamically in real-time even when there are no spare neurons left on a layer. Coordination of this reconfiguration is done, as usual, through the HURRI protocol.

Note that in our invention, helper hubs can themselves have helper hubs, and that all unused hubs can be in a common shared pool, to be made into helper hubs (to main hubs or other helper hubs) or main hubs as needed. Furthermore, after the model is instantiated in response to the input of parameters (at initial deployment and subsequently), all unused hubs in the pool can have their power shut off by the control circuits processing the inputs (FIGS. 3A and 3B) to further reduce the energy consumption of our invention (and power turned back on when the unused Hub needs to be converted to an active (not unused) Hub.

Figure 8:
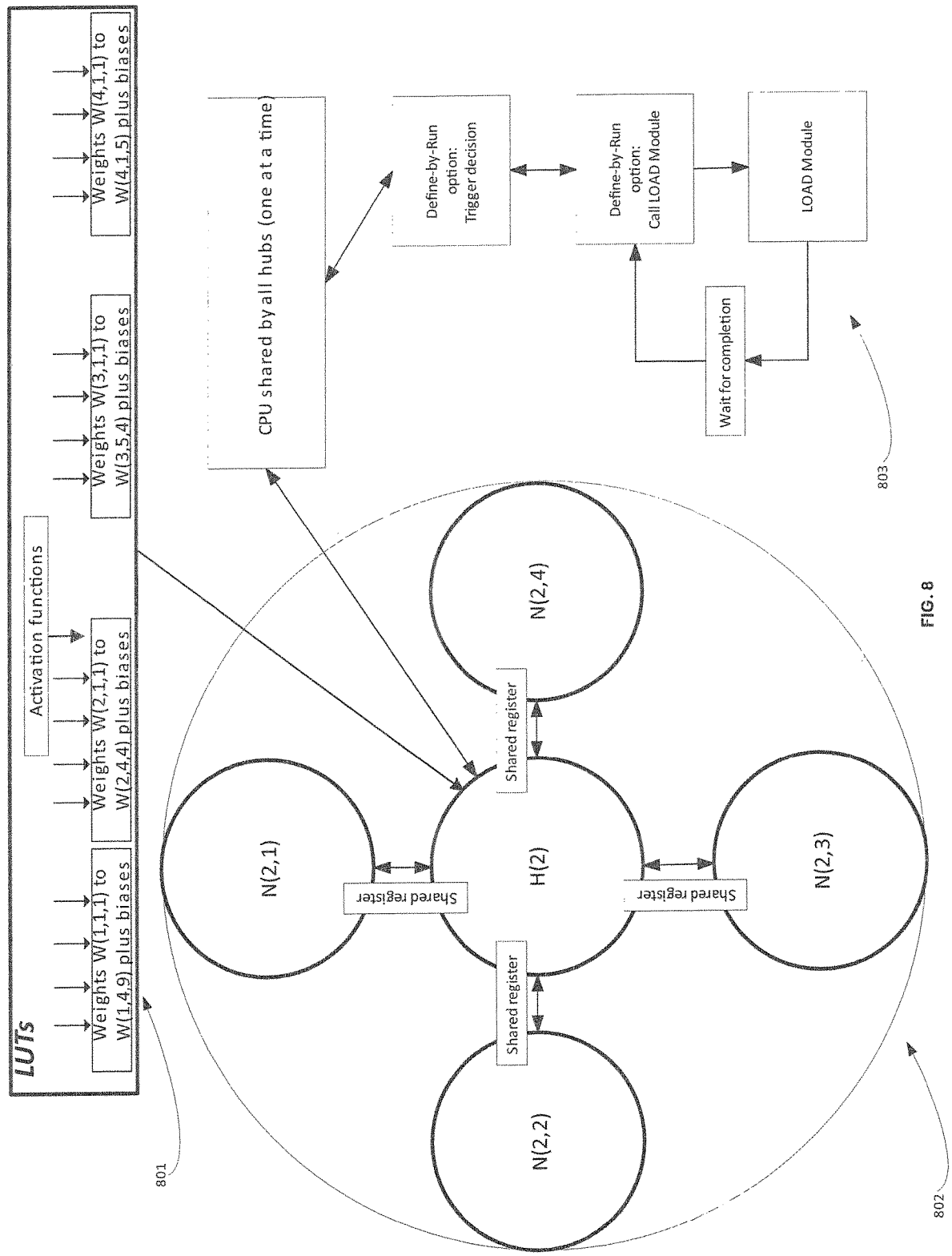
FIG. 8 shows a define-by-run decision that changes weights, biases, and activation function parameters, according to at least some embodiments disclosed herein.
Figure 9:
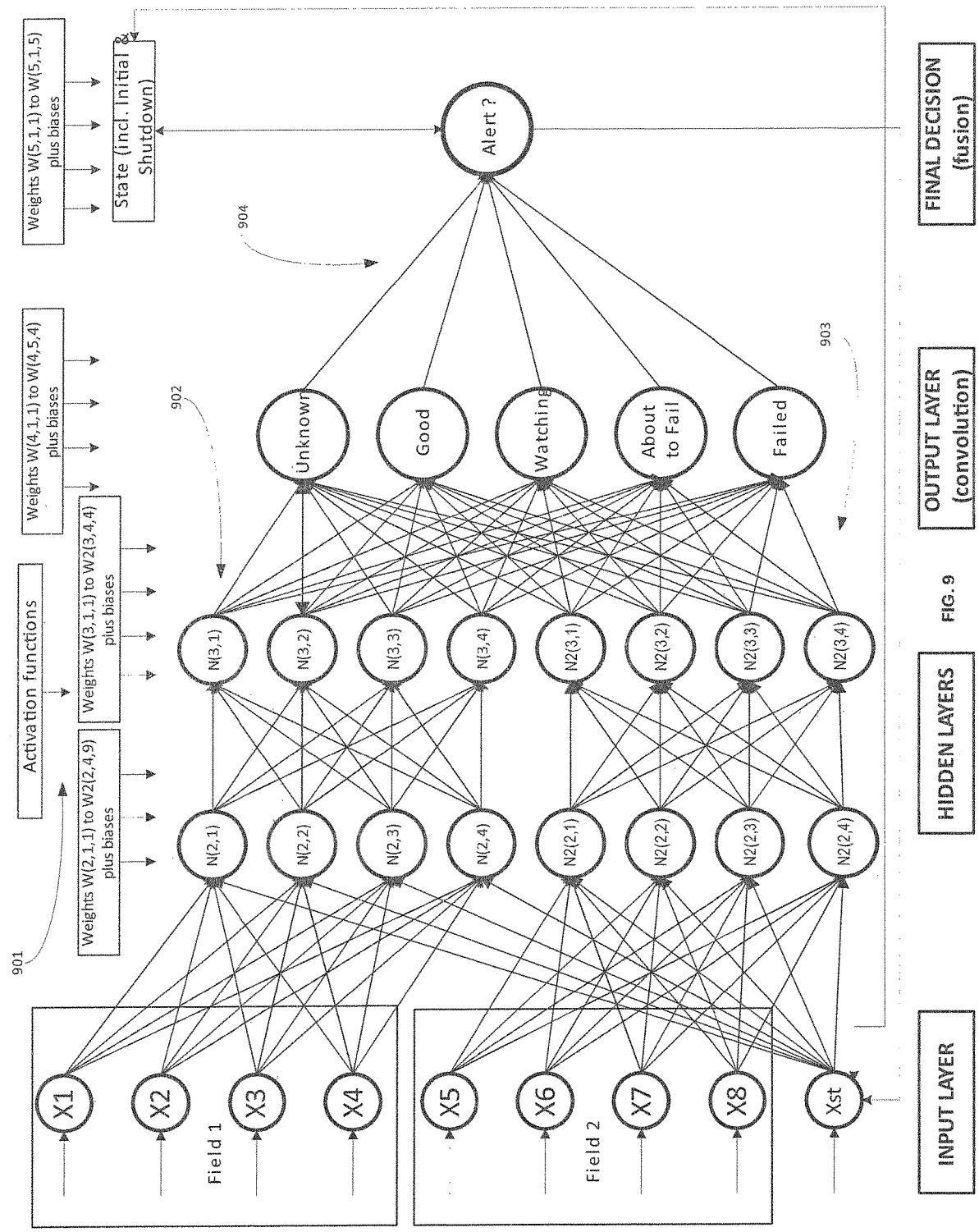
FIG. 9 shows a traditional CNN with neurons fully connected, according to at least some embodiments disclosed herein.
Figure 10:
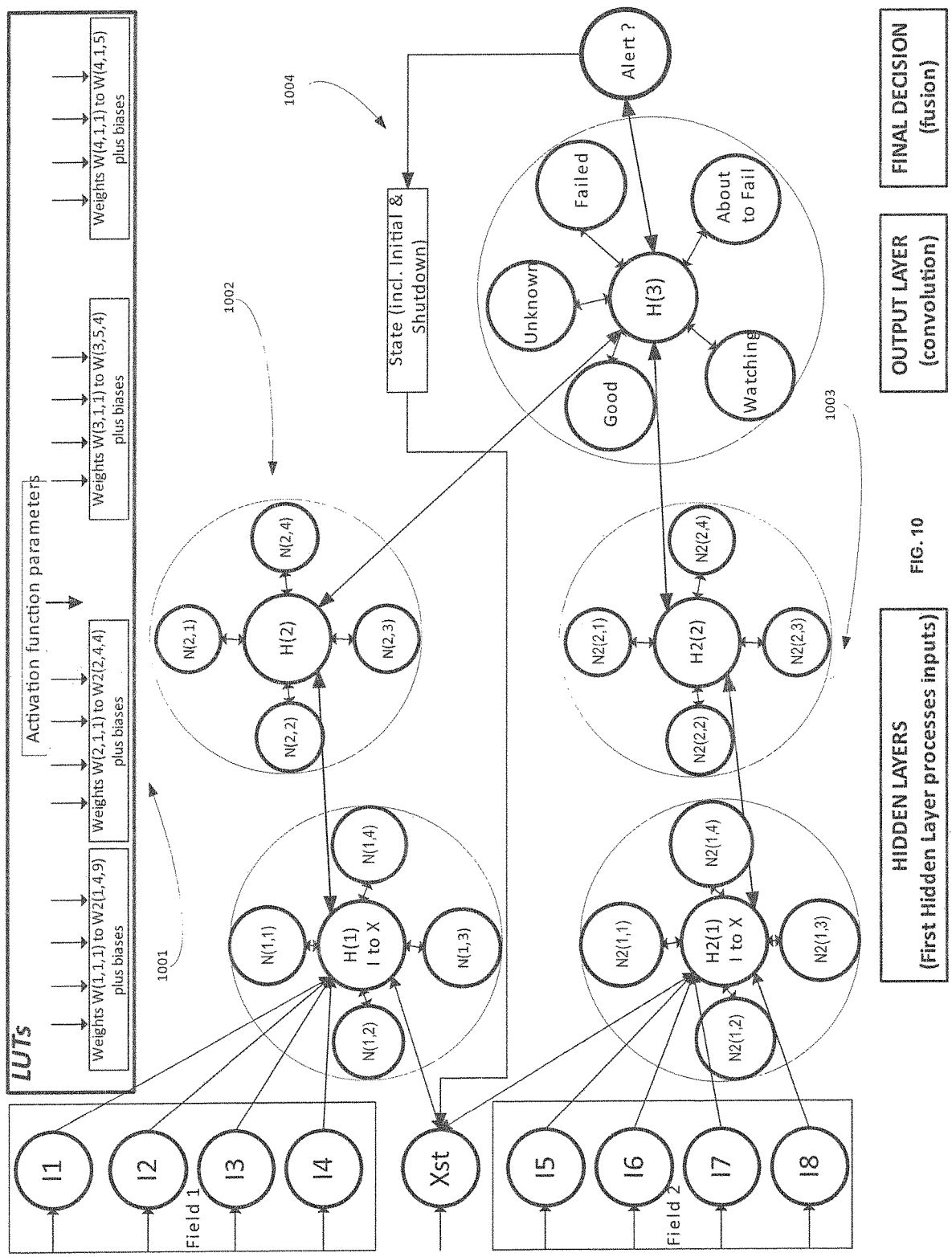
FIG. 10 shows an enhanced CNN using hubs with fewer wires than a traditional CNN, according to at least some embodiments disclosed herein.

FIG. 8, returning to the theme of FIG. 6, shows how fully general define-by-run is implemented, and shows the LOAD Module that is used by HURRI, as well as the shared CPU. The LOAD Module, 803, halts all current processing, and updates (one or more) hubs, 802. As in earlier drawings, x01 for Drawing #x, depicts the LUT holding the model inputs, but here 801 plays an especially significant role, since the LUT holds the new values that must be loaded. FIG. 9 and FIG. 10 show the use of fields (often called "receptor fields" in vision and image recognition applications) to implement CNNs, both the traditional neuron-only way (FIG. 9), and our Hub-and-neuron way (FIG. 10), as discussed previously. Two fields are used for illustration.

In FIG. 9, 901 are the inputs, as in earlier drawings, 902 illustrates the individual fields, 904 is the final convolutional operation, and 903 is the state feedback. The large number of wire interconnections is clearly exhibited.

In FIG. 10, using our Hub approach, 1001 are the inputs from the LUT, 1002 is representatives of the inputs going separately to each field, 1004 is the final convolution operation, and 1003 is the state feedback. The greatly reduced wiring is obvious; the wiring savings per layer is multiplied by the number of fields, making the use of hubs in CNNs very attractive.

Figure 11:
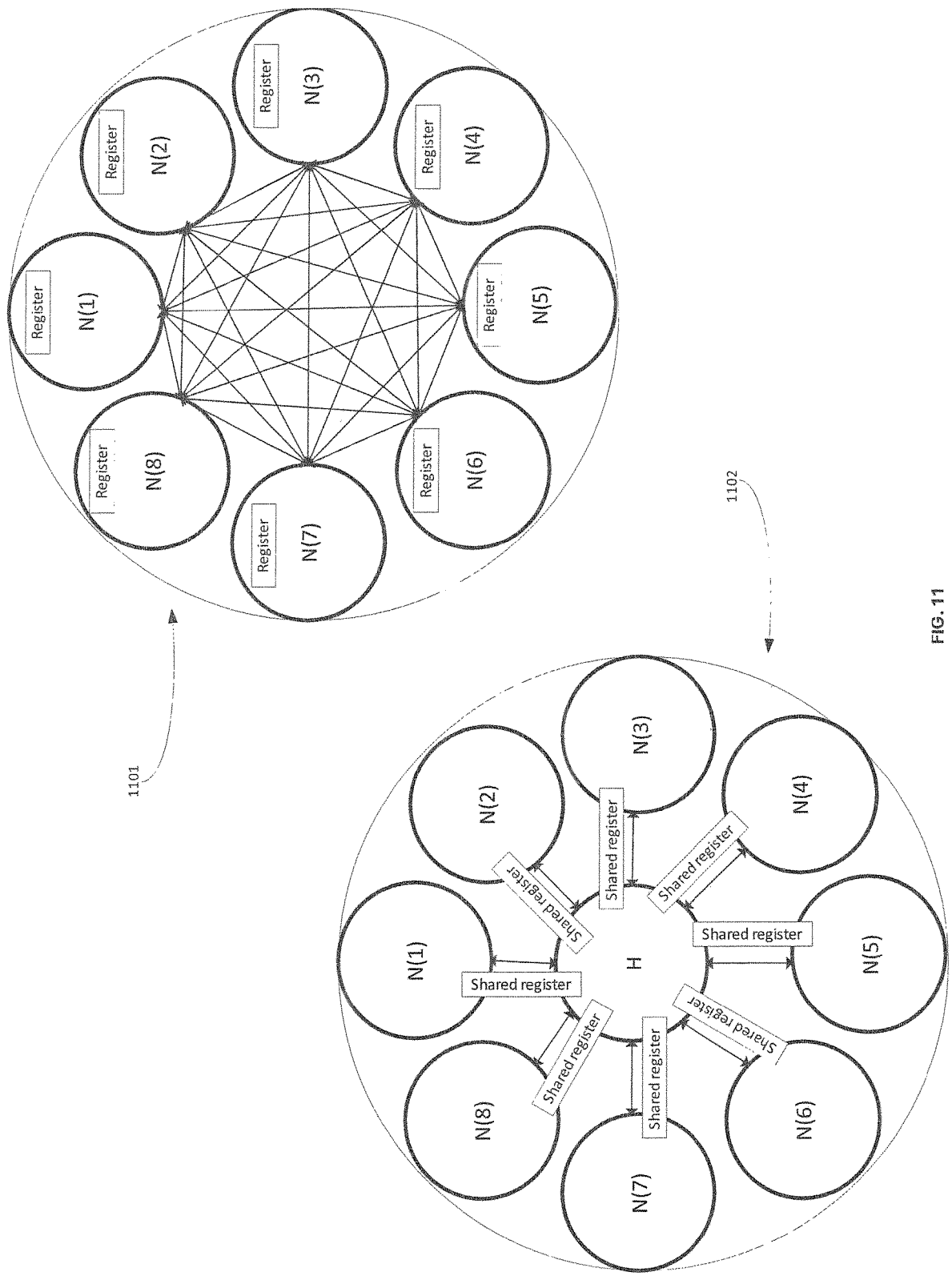
FIG. 11 shows a traditional Hopfield network with all neurons interconnected, according to at least some embodiments disclosed herein.

FIG. 11 illustrates a Hopfield network, showing both the traditional implementation 1101 (fully connected neurons with only a single layer—the defining topology of a Hopfield network) and our Hub invention 1102. Hopfield networks are popular and remain a viable alternative to deep learning networks in certain applications. Hopfield networks require a memory register at each neuron to remember and potentially "flip" or "change" the state of the value (usually bipolar but can be continuous) stored in each neuron; registers are shown in 1101. In our topology, 1102, we can use this required per-neuron register to also transfer data from the Hub to the neurons as well, as we have used in other topologies discussed above, or we can still use wires for that transfer, but the dual use of registers is an excellent implementation choice, leveraging the unique advantages of both Hopfield networks and our Hub invention. 1102 also illustrates the flexibility and malleability of our Hub topology to adapt to, conform to, and build many types of machine learning networks-note that our implementation of a Hopfield network is no different from one Hub of a multi-layer neural network.

Figure 12A:
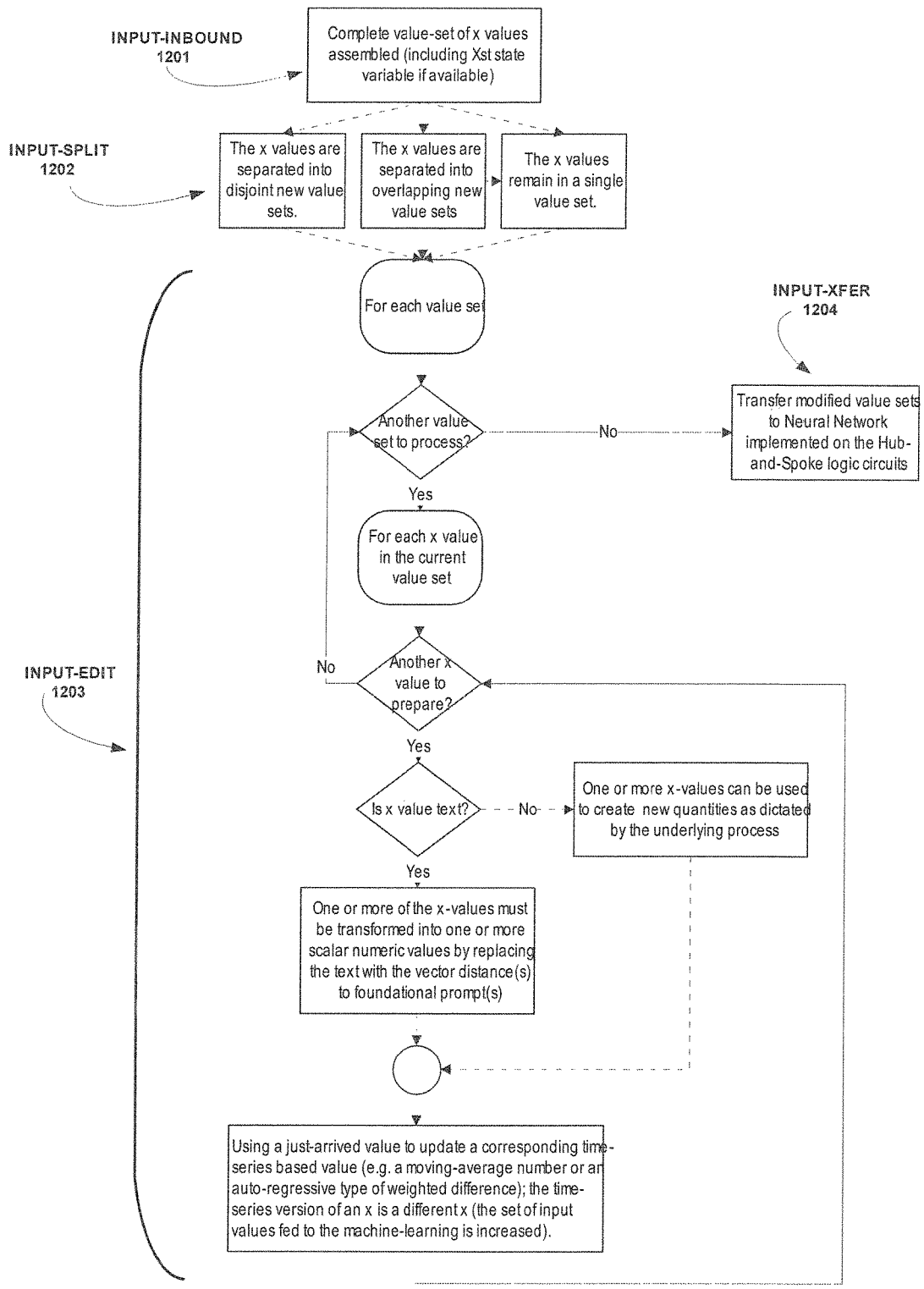
FIG. 12A shows a flowchart of data inputting processes that partitions input to accommodate CNNs, according to at least some embodiments disclosed herein.
Figure 12B:
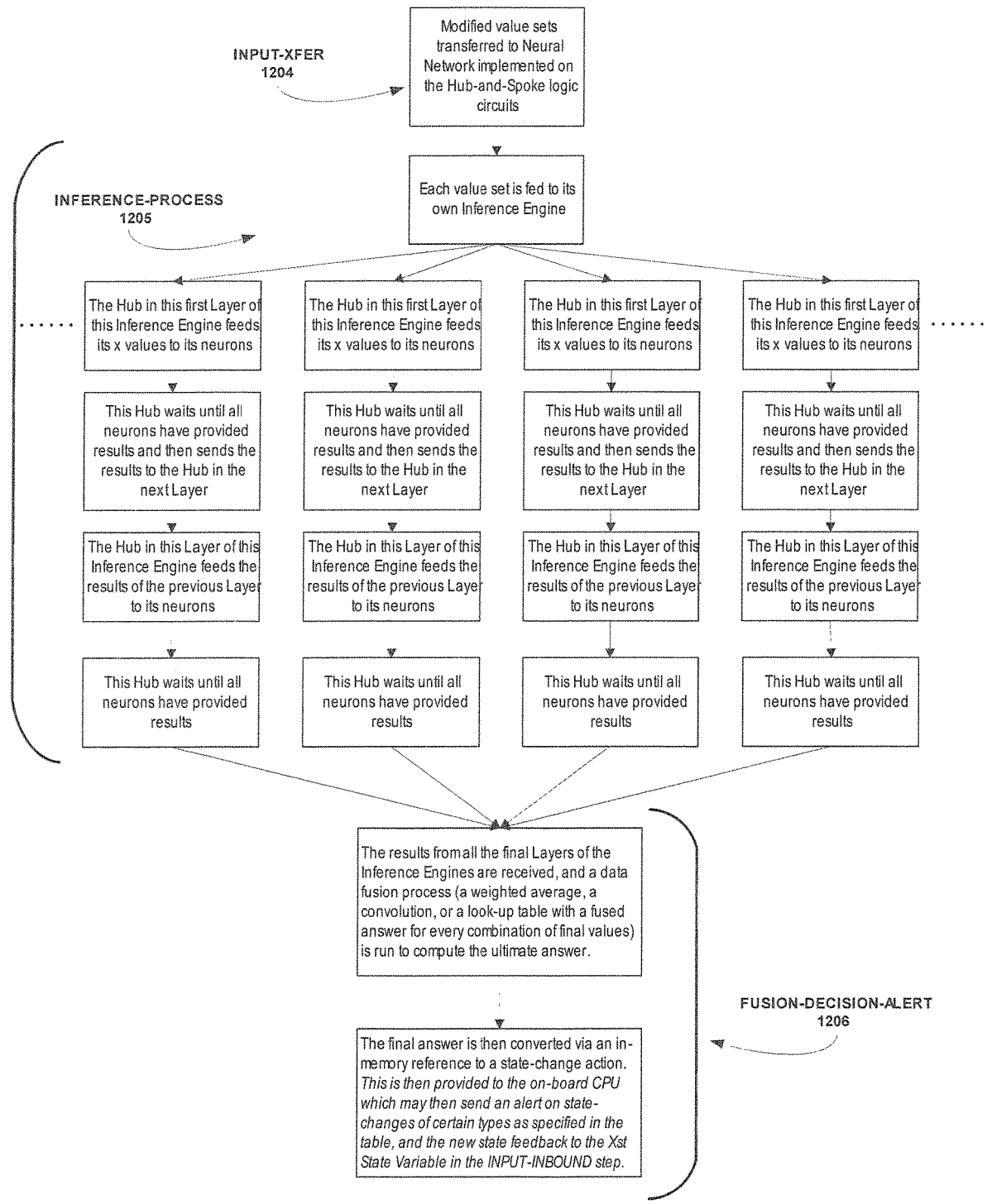
FIG. 12B shows a flowchart of data splitting, routing, running, and re-assembly, according to at least some embodiments disclosed herein.

FIG. 12A and FIG. 12B show the HURRI protocol as it would be used in a single, a segmented, or an ensemble configuration (FIG. 12A) and then in the following step (FIG. 12B) how the input sets derived in the first step would be fed to multiple inference engines as required. In FIG. 12A, 1201, data flows in as usual. At 1202, the inputs are split into sets if necessary, either disjoint or overlapping sets depending on the machine learning model (or not split at all). At 1203, the input values (the "x-values") are transformed if the model so requires it: transformation of text into numeric vectors and then into vector distances is described, as is using time-series filters to transform the data. At 1204 the data is sent to the hubs as the topology dictates (usually the first Hub). 1204 continues at the start of FIG. 12B.

Figure 13:
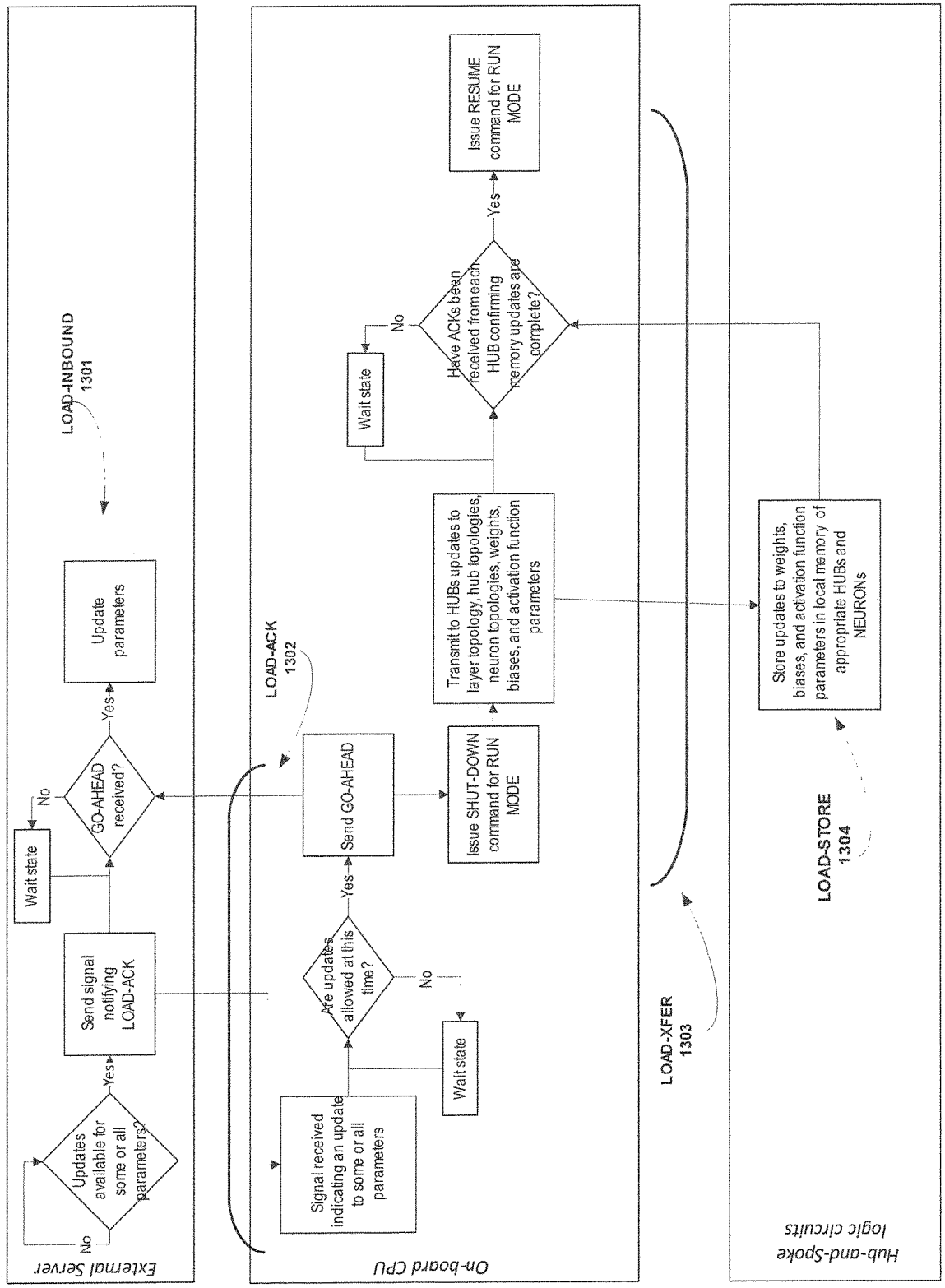
FIG. 13 shows a flowchart of an external server in the hybrid machine protocol signaling that new parameters are ready, according to at least some embodiments disclosed herein.

FIG. 12B continues at 1205 with the data being fed to multiple different inference engines when required, as in implementing ensembles, and the final data fusion step is 1206. FIG. 13 gives details of the processing involved handling HURRI operations, beyond the LOAD module shown FIG. 8. The flow of a HURRI update is shown, starting at 1301 with processing the external signal indicating new parameters need to be loaded, relaying the notice implicit in that signal to the hubs (and their included limited-power CPUs) that processing needs to be halted, and waiting 1302 for a GO-AHEAD response (which implies LOAD MODE takes over from RUN MODE as the operating state, at 1303). The LOAD takes place, 1304, and notice is returned to the previous step at 1303 which then issues a RESUME command to transit back to RUN MODE.

Figure 14:
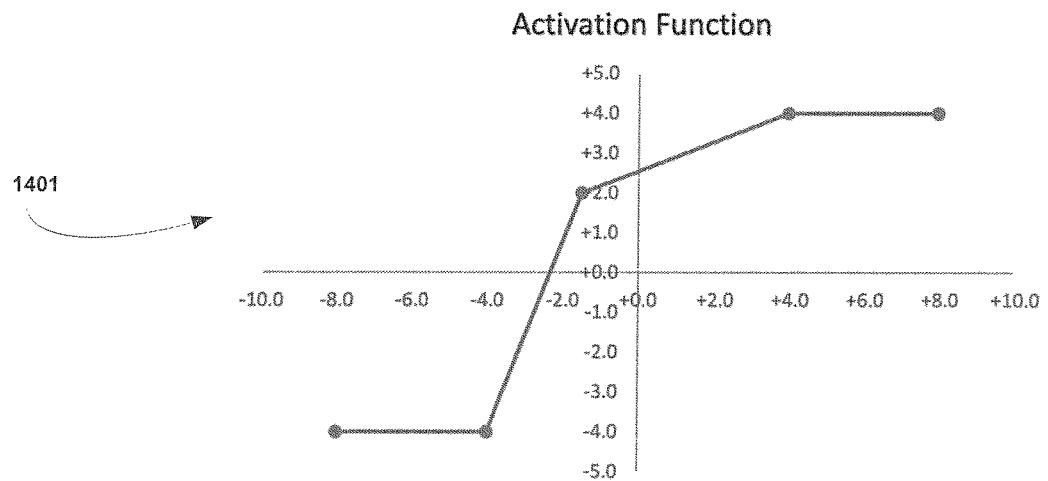
FIG. 14 shows a linear-spline-based activation function, according to at least some embodiments disclosed herein.

FIG. 14 shows 1401 the general type of activation functions used in our system, piecewise linear splines, which are discussed now. The most common choice for an activation function is the two-piece-linear ReLU function, and variations (such as Leaky ReLU and non-linear versions like GELU, SiLU, ELU), plus smooth functions like sigmoid, tanh, swish, and others. FIG. 14 shows our novel approach—an activation function spline approximation which is general enough to closely approximate the activation functions (some are piecewise linear but others are smooth) in use today. Note that smooth activation functions are used for convenience during model estimation (because they are differentiable, and derivatives are used in model fitting optimization), which is not our concern here: during inference we need only closely approximate the activation function values of the estimated machine learning model, and that we can do with a spline.

We call this innovative activation function approach PRELUDE, one of our fundamental invention planks: Piecewise RELU Dynamic Evaluator). PRELUDE activation functions can be adjusted to mimic the behavior of common activation functions but uses only linear splines, taking a cue from the widespread usefulness of ReLU, which itself is a two-piece linear spline (with the first price flat in fact, something we generalize in PRELUDE).

A PRELUDE activation function (see 1401) consists of 4 connected line segments, a linear spline, from -<pseudo.infinity> to +<pseudo.infinity>, where <pseudo.infinity> is a large numeric value that depends on computer word size (a value chosen near the max positive and negative value the word size can accommodate), and is hereafter referred to as <p.inf>. Its exact value is not important for this discussion.

Since the spline has 4 segments, it has two endpoints and three interior knots {K1, K2, K3} on the x-axis. The two end knots are of course -<p.inf> and +<p.inf>. We define the y-axis value at K1 as V1, the y-axis value at K2 as V2, and the y-axis value at K3 as V3. The y-axis values at the endpoints are V0 and V4 respectively.

There are therefore 8 activation function parameters: K1, K2, K3, V0, V1, V2, V3, V4. K1 must be larger than -<p.inf> and less than +<p.inf>. K3 must be greater-than-or-equal to K1. K2 must be in the inclusive interval [K1,K3]. V1 and V3 must be less-than-or-equal to +<p.inf>, and V2 must be in the inclusive interval [V1,V3]. These 8 parameters are part of the model parameter sets shown in earlier drawings at the x01 (for Drawing x) step (and in our invention are stored in the LUT). Via a HURRI operation they can be changed at any time; at the initial load, or any change time, the consistency of the numeric range and inequality requirements just stated for these 8 parameters can be checked.

It is assumed that signed or unsigned integers, of bit-length we denote as B, are used throughout the system (signed or unsigned as appropriate), including for the 8 activation function parameters, for a value of B chosen by the manufacturer (B=8 is a common choice). The manufacturer can also design some of the circuit components to use a maximum number of bits less than B, call it b, potentially with different values of b in different parts of the circuit. Note further that quantization/distillation scaling to the allowed maximum number of bits, and to the value range dictated by the choice of signed or unsigned integers, as well as rounding small values to zero (only necessary when multiplication operations are done in serial, since a parallel multiply by any value adds no additional time to the computation) can be done during parameter input, as depicted in FIG. 3A, and also during the input ingestion, since inputs need to be integer values as well as, such processing depicted in FIGS. 3A and 3C. Furthermore, during that processing, to avoid re-scaling when future values (for inputs, or for parameters that are not bounded by −1 and 1, as weights are, but other parameters might not be) arrive, a conservative estimate of the maximum possible value that will be seen in the future must be made (and any future values exceeding this estimated maximum are set to the estimated maximum), and likewise for minimums. This is a common statistical practice known as Extreme Value Theory, and estimators like Hill's estimator are easy to compute on scaled integer values after an initial scaling, then used to adjust the final scaling.

Figure 15A:
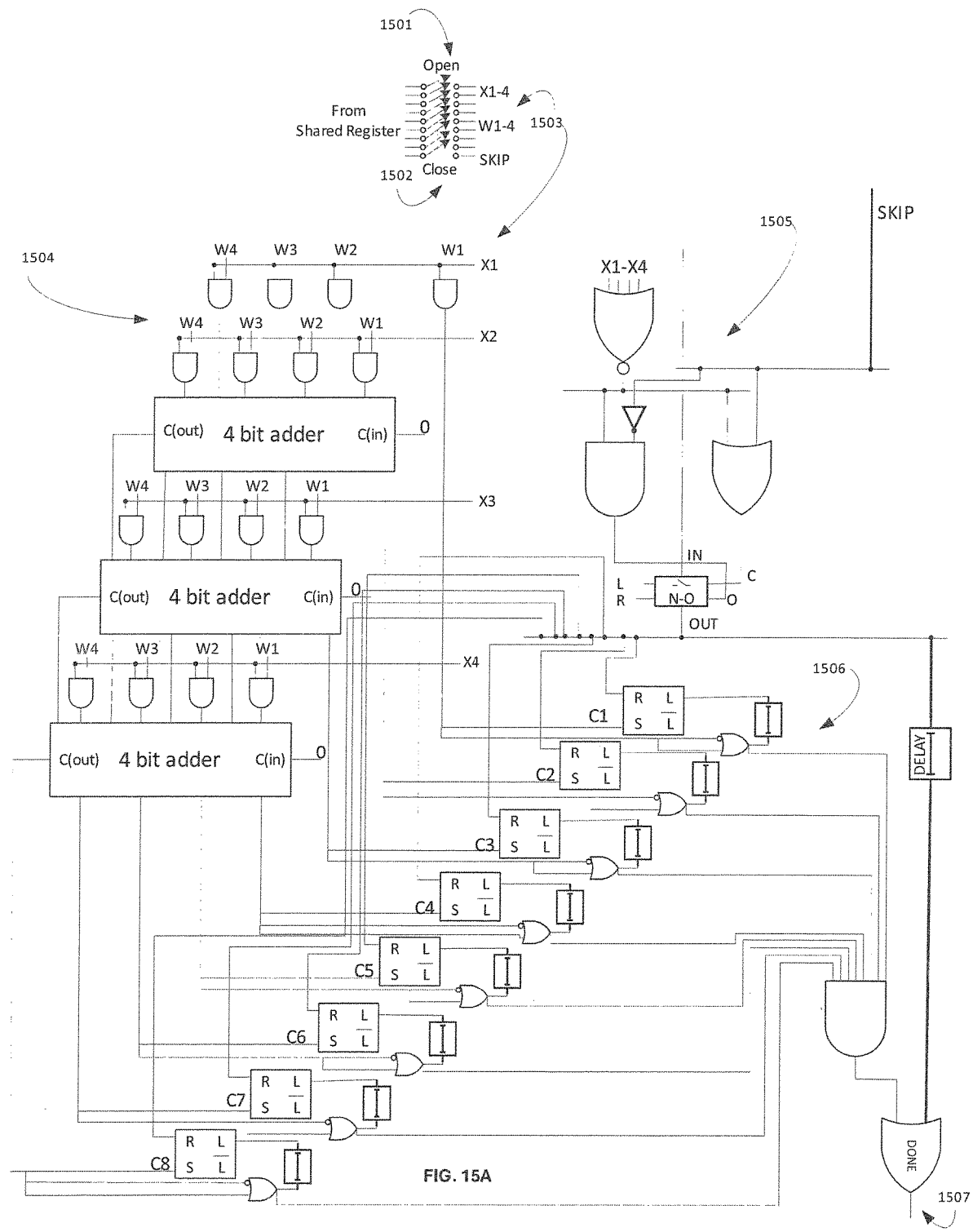
FIG. 15A shows a wiring diagram of a serial processed neuron, according to at least some embodiments disclosed herein.
Figure 15B:
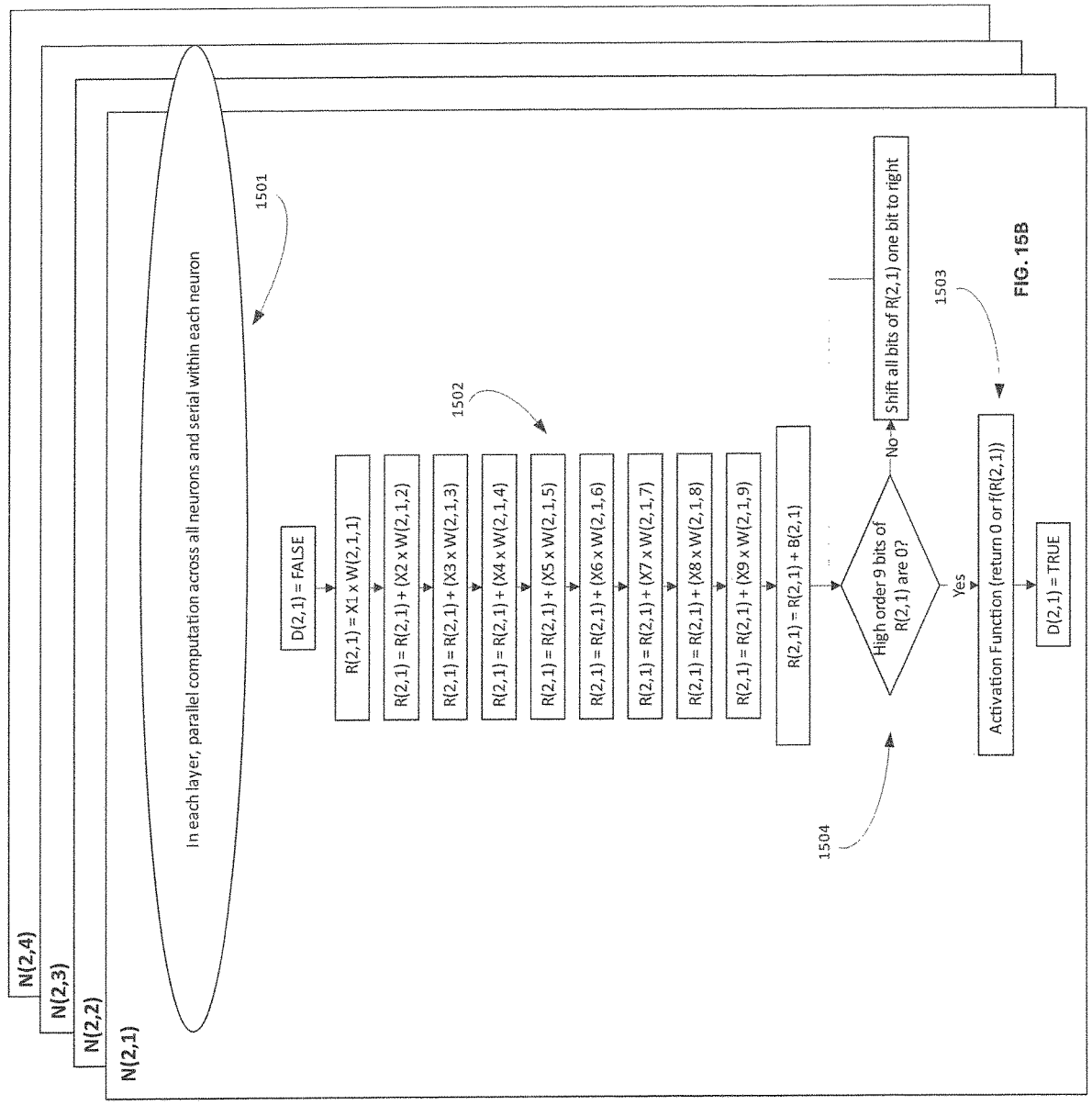
FIG. 15B shows a logical diagram of a serial processed neuron, according to at least some embodiments disclosed herein.
Figure 15C:
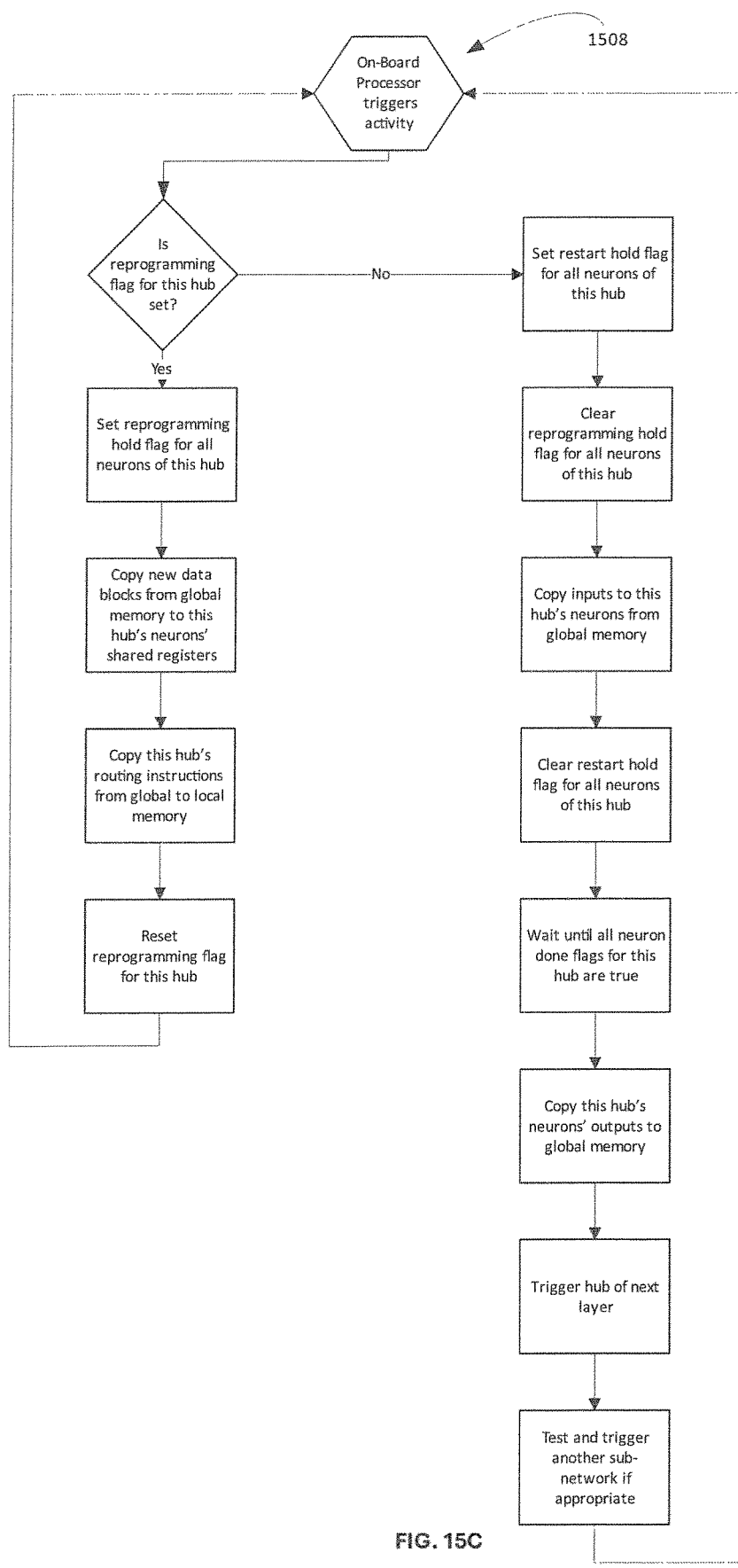
FIG. 15C shows a logical diagram of a Hub, according to at least some embodiments disclosed herein.

More detailed examples and explanations of actual circuits and processing are presented in the three drawings FIG. 15A, 15B, 15C showing respectively (15A) the circuit diagram of a neuron making its "weights multiplied by inputs then summed" calculation (often referred to as Multiply-Accumulate or MAC), (15B) a Logic Diagram of a Hub of neurons where processing across neurons is parallel but each individual neuron is serial, and (15C) a detailed flowchart of Hub processing for a HURRI parameter update operation. These drawings are for explanatory and expository purposes.

In FIG. 15A, we use as an example an inference instance of a system with 4 input variables, X1 through X4 (in previous examples we had 8 input variables, X1 thru X8, but we exhibit a smaller problem now for ease of exposition). At each neuron therefore there are four weights, W1 through W4, that are each being used to multiply the corresponding X's. These values, the X's and W's, have to be loaded into the neuron circuitry, either by a wire feed or retrieval from a shared register, which is what we choose for this diagram. Data enters at 1501 and ends at 1502. 1502, 1504, and 1505 show the details of the gates used to perform the arithmetic, and the final summation of the (Wi multiplied by Xi) products is done in the circuitry at 1506, with an exit of the process at 1507. Note that for illustration we are using 4-bit unsigned integer precisions here. Note also that at 1505 we test for a zero multiplier and skip any multiplication involving it (this circuit would typically be used when the neuron processing is sequential rather than parallel, since, when processing in parallel, a useless multiply-by-zero wastes no time as it takes the same time as the other multiplication operations taking place simultaneously; note further that suppression of a large number of multiplies-by-zero in parallel mode might however save power consumption, and logic can be developed to make that decision, balancing the savings against the power consumption of the zero-test and extra circuitry, the question turning on the expected number of zero multipliers).

In FIG. 15B, by contrast with the earlier FIG. 5, we are showing the workings of the Hub (HUB 2 in this case) handling 8 inputs for each of its 4 neurons in parallel, but the processing within each neuron is serial, 1501 being the data entry as before, with processing at 1502, 1503, and 1504. A shift to avoid overflow is also illustrated.

FIG. 15C is a flow chart that adds detail to the processing of updates to a Hub's parameters, a HURRI operation, in this case triggered by a signal from an on-board processor 1508. In previous diagrams this detail was collapsed under the term LOAD.

Figure 16:
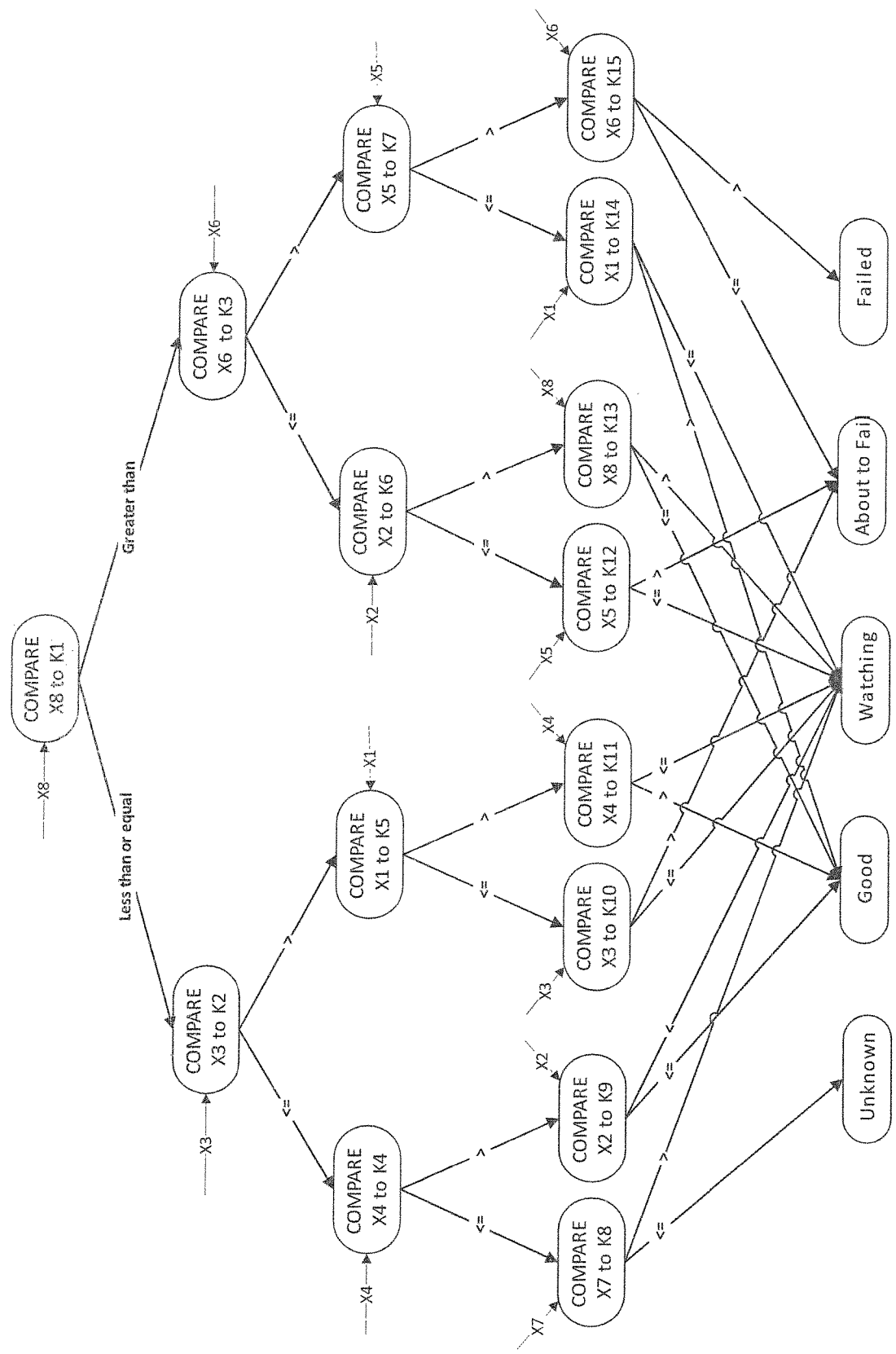
FIG. 16 shows a decision tree machine learning inference engine, according to at least some embodiments disclosed herein.

FIG. 16 shows how a decision tree inference engine would be implemented in our Hub architecture. As discussed, many additional types of machine learning inference engines can be configured from our Hub-and-neurons, or hubs-alone, topology, especially when the hubs are instantiated with processors (typically low power processors). We use a Decision Tree as an example. FIG. 16, 1601 shows processing beginning at the first Hub, which is considered a Hub for a "level" as opposed to a "layer" as in neural networks. Processing starts at Level 1, then proceeds "down" through (in this example) 4 more levels, Levels 2, 3, 4, and 5. Levels 2, 3, and 4 (more generally all levels but the final decision level) have a number of hubs that is a multiple of the number of hubs in the immediately preceding level, a consequence of the tree structure. The final decision level has a Hub corresponding to every possible final prediction or alert action of the model.

For a given input data set, the inference execution path follows only a single route from top to bottom of the tree ("root to leaf"), thus only one Hub at each level is invoked. This is a perfect fit for our Hub architecture, since non-active hubs for a given inference data instance consume no resources whatsoever, and routing to the correct Hub in the next level is a straightforward choice of wire based on simple numeric comparisons. In fact, in problems with a moderate number of inputs (this number depends on the wiring and LUT memory decisions made by the manufacturer), the Hub comparisons at each level (comparisons take place in all but the final level) can be made in parallel, so that all Hub decisions are made at once, and the final decision is arrived at in one operation. Furthermore, it is possible to compute the comparison decisions in advance for certain ranges of inputs, and store the answers in LUT memory, making the decision calculation even faster.

Summary of Our Six Key Innovations or Concept Planks

Key planks of the disclosure include CHAMELEON, HURRI, MINUET, PRELUDE, RAIL, and STAND-UP, which are summarized in the table below.

| Plank Name | Name Expansion | Use |
| --- | --- | --- |
| CHAMELEON | Chip Hierarchical Architecture MachinE Learning Engine Optimizing Nodes | Fundamental Hub-and-Spoke architecture (spokes are neurons) |

| Plank Name | Name Expansion | Use |
| --- | --- | --- |
| HURRI | Halt/Update Reload/Resume Interface | Managed communications protocol for downloading and installing new model parameters |
| MINUET | Multiple INference Unified Edge Training | Configuring multiple machine learning models (post training or re-training) to update multiple inference execution engines |
| PRELUDE | Piecewise RELU Dynamic Evaluator | A parameterized approach to defining a flexible family of linear splines to closely approximate standard activation functions |
| RAIL | Reduced Arithmetic Instruction Logic | Enforcing quantization of input values and parameters when the trained model was not distilled; limiting arithmetical and logical operations needed |
| STAND-UP | Sized Topology Architecture for New Data and Update Processing | Designing a product line of ASICs or FPGAs stratified by size (max number of layers and neurons) to allow engineers choices for cost and power needs |

Below are additional technical details to help explain the intricacies of our invention, plus details on RAIL which has not been discussed previously, and a reiteration of some points made previously with additional exposition to better communicate some important principles.

We have discussed above the key role of the HURRI protocol in carefully managing the updating of model data and model structure, an extremely important and innovative aspect of our invention. We have not explained the message structure that is used in HURRI updates; we do so now:

The HURRI Protocol Message Notation uses the same H( ) N( ) W( ) [and B( ) for bias values and A( ) for activation function parameters] notation used elsewhere in this disclosure, but now in a normative sense, not a descriptive sense. In other words, a full set of H( ) N( ) W( ) B( ) and A( ) values fully defines the architecture (structure and layer order) of Feed Forward neural networks, with the addition of H( ) pairs that need to communicate backwards, for an RNN, or with the addition of field numbers for CNNs and other multi-engine topologies (like ensembles). Furthermore, additional pairs of H( ) values that may not be sequential but nonetheless need to communicate (and thereby launch processing on a particular Hub) are used to define more advanced on-the-fly computational order changes (skipping layers, early termination, helper hubs, etc.)—actual execution of such logic would be done by (limited compute power) processors in the hubs at run-time, but the use of HURRI to define and change the network structure is what allows this to be accomplished.

In HURRI, neural network structure is defined implicitly. There is no need to specify, for example, that Hub 4 has 5 neurons, nor that there are 6 total hubs. The presence of H(4) in a HURRI message, along with the presence of N(4,1), N(4,2), N(4,3), N(4,4), and N(4,5)—but no other N(4,x)—takes care of the "Hub 4 has 5 neurons" specification, and the presence of H(1) through H(6) but no H(7) takes care of the "6 total hubs" specification.

An extension "modifier" to the H( ) notation (details below) allows for the definition of "Helper hubs" as previously discussed.

Specification of the H( ) N( ) W( ) B( ) and A( ) values can be in any order. A complete set of such values is used to define the network initially, and then any consistent subset of values can be used at any time later to change or extend the architecture, as well as update values. A minus sign, as in –H(6), is used to signify the elimination of a component (when a Hub is eliminated, so are all of its neurons, and any interconnections between the eliminated Hub and other hubs, plus the elimination of any helper hubs connected to the eliminated Hub). Of course elimination means simply that no processing takes place using these components; obviously no wires are removed (and in fact the wires now not being used can in some cases be re-assigned if and when new parts of the network structure are instantiated).

Note that the HURRI processor, which is, in essence, a layout engine, can use simple integer parsing and evaluation to check the sanity and limits of the implied implementation (the hardware might not support 500 layers, for example), and to find and report erroneous or illogical specifications— for example, instantiating a neuron N(6,1) when there is no H(6). Note however that Hub numbers, and neuron numbers on neurons attached to a Hub, do not need to be sequential— skips are allowed, as they may result from the elimination of particular hubs and neurons (there is no need to renumber or "pack" the numbers sequentially, since hub-to-hub routing is controlled by the topology, not the assigned numbers, and Hub-to-neuron communications already skips unused neurons that might have zero weights).

The HURRI Protocol commences by sending the desired (new or updated) neural network configuration as a structured message string consisting of individual tokens, following the notation explained below. The tokens may be sent in any order, there is no need to sequence, and all tokens presented represent new or updated elements or values, or deletions—all prior elements remain as is (unless explicitly deleted with a minus-sign token), and all values remain at their current levels until changed (there is no need to delete values, rather HURRI deletes the element they apply to, or for inputs, simply does not include that input number in any further inferences). This approach is known as "cascading".

Hub Notation

The letter H then in parentheses:
Hub Number (its Layer) and its field (receptor field in a CNN), separated by a comma.
If a Helper Hub, Helper Number after a dash following the letter H but before the parentheses.

Examples

H(2)—A single Hub in Layer 2 in a simple feed-forward NN or RNN.
H(2,1)—The Layer 2 Hub in the first receptor field of a CNN(or the first inference engine in an ensemble).
H–1 (3)—The first Helper Hub for the main Hub in Layer 3.
H–2 (3,4)—The second Helper Hub for the Layer 3 main Hub in field 4 of a CNN(or the fourth inference engine in an ensemble).

(Note: ensembles of CNNs are not typically used, but if desired would require an extension to the H( ) notation, not discussed here for brevity.)

Neuron Notation

The letter N, then in parenthesis (as with helper hubs, the helper number of the associated Hub goes after a dash following the N, but before the parentheses).

The ordered pair (Hub Number, Neuron Number), or the ordered triplet (Hub Number, Field Number, Neuron Number).

Examples

N(3,2)—The second neuron of the single Hub in Layer 3,
N-1(4,3)—The third neuron in the first Helper Hub of the main Hub in Layer 4.
N(3,2,5)—The fifth neuron of the main Hub in Level 3 of Field 2 (of a CNN, or $2^{nd}$ inference engine in an ensemble).

Weights Notation

The letter W, then an ordered triplet or an ordered 4-tuple, the initial two or three elements constructed exactly like the neuron N( ) notation, with the Input Value Number added last (thereby specifying how this weight is used).

Examples

W(4,2,3)—The weight used for input 3 in the second neuron of the single Hub in Layer 4.
W-1(4,3,1)—The weight used for input 1 in the third neuron in in the first Helper Hub of a single Hub in Layer 4.

Biases Notation

The letter B, then proceed exactly like neuron N( ) notation, since there is just one Bias value per Neuron.

Examples

B(3,2)—The bias used for the second neuron of the single Hub in Layer 3.
B-1(4,3)—The bias used for the third neuron in the first Helper Hub of a single Hub in Layer 4.

Activation Function Parameters Notation

The letter A, then continuing exactly like the weights W( ) notation, except there must always be exactly 8 values (in place of the weights), since the activation function spline is defined by 8 parameters.

Specifying Values in this Notation

Following W( ) B( ) and A( ) tokens there is always an equal sign followed by the actual value, scaled according to the rules discussed elsewhere in this disclosure.

Example

W(4,2,3)=39

There are some minor but vital additions to the notation system described so far:

In the H( ) notation, H' indicates an initial Hub that has a (limited compute power) processor to handle the input layer, so there will be no input layer constructed; in most practical situations an H'(1) will in fact be used. The 'character does not need to be repeated to substantiate a Helper Hub for a Hub that handles input, the following is fine (if a' is specified on a Helper Hub it is ignored): H'(1) H-1(1)

In the H( ) notation, H" indicated a final layer that has a (limited compute power) processor to handle alerts and similar post-inference issues (communicating predicted state back to the input, etc.).

As noted above, other hubs can have (may require) low-compute-power-processors to make routing decisions. Manufacturers may offer different types of such processors depending on their capabilities, and we use superscripts in square-brackets to indicate the type of processor (with 1 being the lowest power) to instantiate with a Hub (the exact choice of processors is up to the manufacturer; the range of processors offered in various numbers and configurations is part of the STAND-UP advance).

For example:

$H^{[1]}(2)$ specifies a processor of Type 1 (lowest power) for Hub 2

$H^{[4]}(3)$ specifies a processor of Type 4 (higher power) for Hub 3

For engines featuring hubs with (typically low compute power) processors that make dynamic decisions on routing to implement define-by-run and similar strategies, the O( ) notation is used to capture the outputs from a neuron (as transmitted to the neuron's Hub). O( ) has the exact same syntax as N( ). Note that other instructions for the processors will depend on the processor type chosen and such matters are not discussed herein.

As part of the HURRI protocol, the Hub topology needed, as well as the routing/sequencing order of Hub processing, has to be specified, and potentially changed adaptively over time. The basic specification is a selection from one of four keywords:

BUS DIRECT STAR SWITCH (See FIG. 5)

If this keyword is left unmodified, it applies to all fields (for CNNs) and sub-models (for ensembles). To limit the scope of the keyword, append ": M" to the keyword, where M is the field or ensemble-member number. The result of multiple specifications is cumulative (also known as "cascading"), so:

DIRECT

STAR: 3 links all hubs in a sequential direct pipeline except for sub-model 3, which will use a Star topology. If the main inference engine model or sub-model does not use general hub-to-hub communications (for example, there is only a single Hub, as in a Hopfield network, or the hubs are arranged and traversed in a fixed order, like a decision tree), the keyword NONE can be specified. Example:

STAR

NONE: 2

This specification instantiates a STAR topology for all inference engines except #2 (which might be a Decision Tree). The DIRECT keyword can take an ordering of the hubs, which would typically (but not necessarily) be sequential; this ordering is optional, and sequential is assumed. If no ordering is given, DIRECT applies to all hubs not otherwise referenced.

Note that any Hub that is in the DIRECT sequence, either explicitly or implicitly, that has been removed, is successfully skipped over by the hardware.

Example

DIRECT
  –H(3)

will work, there is no need to specify DIRECT(1,2,4,5) assuming that the 5 hubs 1,2,3,4,5 are the only hubs in the network, since as mentioned above, DIRECT without a Hub list implies "all hubs not otherwise referenced".

The Hub ordering sequence specified in the DIRECT statement can be more complex than a simple list of Hub (layer) numbers. Pairs of hubs that must communicate are specified with a: between them, as in 1:4, and this direct wire link is instantiated in the SoC.

Hub topologies can be stacked, in other words, constructed from smaller subset topologies combined together, as in a STAR of STARs, or a DIRECT pipeline of STARs. Stacked (combined) Hub topologies are notated HH for Hyperhubs, and are (must be) defined explicitly with an HH=statement, as in this example:

HH(1)=STAR(1,2,3,4)
  HH(2)=STAR(5,6,7,8)
  DIRECT(HH(1), HH(2))

The example above creates two STARs of hubs, the two stars connected by a direct link (wire). Here is an example specification for a STAR of four STARs, the first two having 4 hubs and the second two having 3:

HH(1)=STAR(1,2,3,4)
  HH(2)=STAR(5,6,7,8)
  HH(3)=STAR(9,10,11)
  HH(4)=STAR(12,13,14)
  STAR(HH(1), HH(2), HH(3), HH(4))

As just illustrated, all keywords, not just DIRECT, can take a Hub list in parentheses (but this list only represents Hub processing order in the DIRECT case). And furthermore, HH( ) can be used in this list wherever H can be used.

The HyperHub construction can be iterated, creating successively larger collections of hubs. Continuing the previous example, here is a successive stacking:

HH(5)=STAR(HH(1), HH(2), HH(3), HH(4))
  HH(6)=DIRECT(15,16,17,18)
  HH(7)=DIRECT(HH(5), HH(6))

Which instantiates a topology where the STAR HH(5) (which cross-connects all combinations of the stars HH(1) [hubs 1, 2, 3, 4], HH(2) [hubs 5, 6, 7, 8], HH(3) [hubs 9, 10, 11] and HH(4) [hubs 12, 13, 14]) is itself connected via a single link (wire) to hubs 15, 16, 17, and 18 in sequence.

The notation is forgiving: spaces and multiple lists are allowed. Therefore, the following is legal and compresses the last three statements into two (with one less HyperHub definition needed):

HH(5)=STAR(HH(1), HH(2), HH(3), HH(4))
  HH(6)=DIRECT(HH(5), 15, 16, 17, 18)

There is a further extension to the Hub list construct allowed in DIRECT( ) and the other keywords: two Hub numbers with 3-dot ellipses in the middle, as in DIRECT(1 . . . 6), which is equivalent to DIRECT(1,2,3,4,5,6). And since multiple lists are allowed, the following is legal and useful:

DIRECT(1 . . . 4, 4:5, 4:6, 4:7)

This builds a direct wire link sequentially connecting hubs 1, 2, 3, and 4, and then three single-wire direct links from 4 to 5. 4 to 6. And 4 to 7. Note that without further specifications the hubs 5, 6, and 7 cannot communicate with each other, which might in fact be the exact correct instantiation of this tree-type topology.

Note that the specifications (using hubs 4 and 5 as an example) STAR(4,5), STAR(4:5), and STAR(4 . . . 5) are equivalent to each other and equivalent as well to each of DIRECT(4,5), DIRECT(4:5), and DIRECT(4 . . . 5)—which are also equivalent to each other-so is unlikely to be used in practice. Furthermore, specifying solely just a single pair of hubs (via any of the three ways of writing a pair just illustrated) in BUS or SWITCH (or including the: notation specifying a direct link even if other Hub numbers are included in a BUS or SWITCH) wastes hardware by forcing the instantiation of intermediate circuitry to connect just two hubs, and should be avoided in practice.

If there is an ambiguity regarding how hubs are connected, because of multiple specifications for the same Hub explicitly or implicitly, as in the following two examples:

Example 1

DIRECT(4 . . . 10)
  STAR(5,6,7)

Example 2 (Applying to all Hubs Implicitly)

DIRECT
  STAR

Then the instantiation process follows the given contradictory directives in the precedence order:

DIRECT, STAR, BUS, SWITCH

It is clear that HURRI provides a full specification for defining and instantiating a neural network (and other machine learning models like decision trees), as well as updating and changing them.

We continue now with additional comments to aid in understanding our invention, then concluding with a description of RAIL.

Note that the initial state value, Xst, and periodic changes to it, of the real-world system being monitored by the inference engine, can be a hard-wired input or a telecommunications input from an external device, or even entered manually.

Every time the latest Xst value was not predicted correctly by the inference engine, the values (predicted and actual) can be stored (in the engine's LUT or other memory), and then re-training can happen-even at random intervals—and this can be accomplished on a CPU in non-real time, the CPU being in the SoC, on a circuit board connected to the SoC, or fully remote.

We have already noted that an enhancement to the standard Feed Forward processing order (each layer feeds the next) is made possible by our Hub architecture: if a condition (computed at the Hub via its associated processor, typically a low-computing-power CPU) is met, just terminate the Feed-Forward and pass the current answer (prediction) on to the final node (using the hub-to-hub communications topology). But there is a third alternative: keep going as per Feed Forward processing, but carry along (as a side channel) the just-completed layer's final answer so that it can be used in an ensemble-like data fusion at the end. We term this a 3-way option: CONTINUE/JUMP (to end)/RELAY (value).

Hub arrangements can be arbitrary and complex, allowing the construction of inference engines for more esoteric machine learning models beyond Feed Forward, RNN, CNN, and Decision Trees.

If our inference engine SoC is being used to monitor and predict state-changes for a real-world system, additional circuitry can be added to specifically keep history of state-changes, compute historically-observed state transition probabilities, and then use these values as additional input data for the machine learning model. The SoC circuit board can also include (not only additional processors) but state-change-machinery.

A Note on FPGAs

FPGAs have become a popular choice for machine learning computing "at the edge", because of their ability to have their programming modified in-the-field (as their name implies) in near-real-time. But FPGAs can be expensive when a large number of gate interconnection wires are required, and large numbers of interconnections are the hallmark of neural networks. Additionally, a lot of effort goes into updating the machine learning model on the FPGA periodically and frequently, since model evolution (remotely on large model estimation hardware) is the norm, due to the fact that machine learning models improve, often dramatically, as they are further trained (re-estimated) when new training data becomes available, as it often does in large volumes. Current engineering state-of-the-art is centered on the belief that this constant updating requires an FPGA, but our invention allows this updating to take place without reprogramming, opening the door to much-less-expensive ASIC architecture. Note however that our invention supports not only implementation in an ASIC, but implementation on a non-field-programmable (program once) FPGA which can be manufactured by current FPGA producers in the industry without tool-and-die changes; this might be an attractive alternative for convenience (not having to fabricate an ASIC), at a price point lower than current FPGAs due to the fact that field programming does not need to be supported.

In current state-of-the-art engineering, much effort is expended on distillation (reduction) of machine learning model complexity to allow the model to run on limited "edge" hardware. By focusing on inference engines only, but allowing them to be modifiable without re-programming, we eliminate much of the need for distillation, using only quantization (converting floating point values into limited-range signed integers, a common practice).

We have discussed facet-masking above. Note now that facet-masking also allows deployment of (multiple, in an ensemble) smaller models (fewer input variables) that are data-fused at the end if necessary, preserving all the explanatory power of the full-sized model. This design allows a new type of distillation with no loss (and possibly a gain due to less noise in the data) of accuracy, and no speed penalty since all members of the ensemble can execute in parallel.

We need to stress that our inference engine can support machine learning models that mix all types of data as inputs: numeric, categorical (labels, multinomial data, or ordinal data), text segments (log file messages, customer comments, 911 calls), spatial data, digitized images, audio, and video.

We have discussed above the tradeoff between simplex wiring (one wire, half-duplex communications with line-turnaround needed if and when the direction of data flow has to be reversed) and duplex wiring (two wires, full-duplex communications with data flowing in both directions, no line-turnaround needed). This tradeoff can be made to optimize wiring costs, or alternatively to minimize run time, or a compromise between these extremes. Similarly, nodes (hubs or neurons) that need frequent inter-connection communications can be grouped close together in the ASIC or FPGA layout, building "neighborhoods" of nodes. Communications within a neighborhood—call it a data lane—will require simpler wiring, while communications between neighborhoods—call it a data highway—will use more robust wiring. As with count limits on hubs and neurons, these wiring decisions can be made at manufacturing time, and different versions offered to application designers, at different price points.

We have mentioned above that one current engineering approach (which we do not recommend) builds hardware for inference with a single layer only, that layer having the maximum number of neurons that appear in any layer. Then as each layer is processed in turn, that single layer is re-configured on the fly and used. We want to clearly explain the following: the two main disadvantages to that approach, while it does cut down on wiring (although not as much as using hubs), is that data values (weights, biases, activation function parameters) have to be loaded every time the "next" layer is invoked and processing is done in strict "no overlap" sequential serial order, while with true multiple layers, sequential processing can still be achieved but overall time-to-finish substantially reduced by our staged pipeline approach-when level L finishes, as soon as it communicates its answers to level L+1, it grabs the answer from level L−1 and starts processing. So all levels are working in parallel eventually, each one on a different stage of processing (the first layer moves on to the next input data set, which typically in high-volume data rate applications has already arrived and is queued for processing).

RAIL: Reduced Arithmetic Instruction Logic

RAIL is a specific set of quantization rules for data along with minimization of the basic arithmetic and logical operations that the underlying hardware of our SoC has to support. It is optional, but can lead to very economical fabrication costs. As part of RAIL, we also recommend memory sizes and storage strategies.

We have noted before that input data (and hence weights, and activation function parameters) need only (can be distilled/quantized down to) B-bit SIGNED INTS, so that is all that is needed as well for the results of arithmetic operations (typically done at twice-B precision and then scaled down (shifted) to fit in B bits as needed). For the common choice of 8-bits, this means all our numbers are scaled from −127 to +127, approximately rounding to the nearest 0.01 which is perfectly sufficient for most real-world industrial numeric measurements (with appropriate scaling).

This also fits well for the common convention of using 8-bit bytes for characters (textual data). A further quantization is possible with text: packing all words in the text into at most a 64 bit structure (keeping the first 8 chars of every actual word, ignoring the rest of the characters)

One exception is ip-addresses, where the full length data value must be retained. Therefore these addresses are converted on-the-fly to 32 bit (4 bytes) unsigned ints for ipv4 or 128 bits (16 bytes) for ipv6. Standard arithmetic operation can do this parsing.

A second exception is for memory addresses, where typically 64-bit (8 byte) unsigned ints are used.

To summarize, data lengths are 1 byte for numeric, 4 bytes for ipv4 addresses, 8 bytes for text words and memory addresses, 16 bytes for ipv6 addresses, to (optionally) deploy for optimizing the hardware resources on our SoC.

We refer to each of these data-storage byte lengths as DS-1, DS-4, DS-8, and DS-16 data stores (those are the widths; it might be convenient in deployment to make each data array 4 gigabytes deep, and we assume that here). Therefore we have for storage calculations:

DS-1=4 GB
DS-4=16 GB
DS-8=32 GB
DS-16=64 GB

All of these storage requirements represent commodity of-the-shelf inexpensive hardware memory modules. The number of each DS types we need depends on the number and element-types of the data facets of the problem at hand. We recommend treating each of the DS stores as a circular buffer. In this way there are current pointers available, such pointers pointing to the observed data values corresponding to the present time, and it is straight-forward to assemble any set of historical data over time (within the extent of our storage). While the history in actuality grows over time infinitely, RAIL suggests keeping the latest 4 gig (~4 Billion) of the latest values, which should be sufficient for machine learning updates developed locally. In processing text data, we also need vector embeddings. RAIL suggests the use of limited-domain static embeddings on a predefined dictionary appropriate for the subject domain. These do not grow significantly over time. Typically, specific domains in general have no more than about 30,000 words that matter, but to be safe RAIL recommends making the limit 64k, which allows 16-bit addressing. Each vector starts as 300 or 768 floating point numbers in the range (−1,1), but we round down to ints from −127 to +127 (which we take as meaning the rounded-down value multiplied by 128), and we dimension-reduce (by standard algorithms) the 300 or 768 dimensions to 256 dimensions, giving us excellent economic and fast operations: 64k entries, each 256 bytes, which is a trivial 16 MB array. We need a good (minimal collision) hash function for every term so that we can rapidly compute text-segment vectors with the above embeddings, therefore it is prudent to leave space and only do about 50,000 words at most, fine for the typical subject-matter domains. Furthermore, the SoC can easily accommodate more than one embedding table if needed (for multi-language applications, for instance, or data that combines facets from more than one domain, like medical and food). Each table is only 16 MB.

The storage of time values can lead to additional considerations, but scaling and rounding can solve those. For example, for consumer data, daypart indicators (in each time zone) like {morning, workday, after-school, dinnertime, evening, night} might be more useful than HH: MM values. Similarly, calendars based on half-years instead of full-years might be useful (half-years have fewer than 256 days, while full-years do not).

With these data representations in mind, RAIL allows a small set of basic arithmetic and logical operations, as follows (note—this reduction step might not be necessary if the hardware manufacturer uses processing chips that already have larger sets of arithmetic and logical operations built in):
CREATE ZERO.
CREATE POSITIVE and NEGATIVE MAXIMA
ADD
SUBTRACT
INTEGER MULTIPLY
TEST {negative, zero, positive} (used with SUBTRACT for COMPARE)
  Example use:
    ABSOLUTE VALUE=TEST then COMPARE and FLIP SIGN if needed
    FLIP SIGN=if TEST POS then SUBTRACT TWICE
      If TEST NEG THEN SUBTRACT FROM 0
SHIFT
  Example use:
    ROUND (to power of 2)=SHIFT and then SHIFT BACK SCALE=MIN and MAX of ROUND values
XOR
  Example use:
    Extract 8-bit bytes using bit masks of all ones (which themselves can be created by shifting MAXIMAL values left and then back right as needed.

Program control is needed to get three more arithmetic values:
LOOP (actually built from the primitive JUMP: increment, compare, jump)
  Example use:
    SUM=LOOP over ADD
    MIN|MAX=LOOP OVER COMPARE Aspects of the present invention are described herein with reference to block diagrams of methods, computer systems, and computing devices according to embodiments of the invention. It will be understood that each block and combinations of blocks in the diagrams can be implemented by computer readable program instructions and/or hardware circuits.

The block diagrams in the Figures illustrate the architecture, functionality, and operation of possible implementations of computer systems, methods, and computing devices according to various embodiments of the present invention. In this regard, each block in the block diagrams may represent a hardware or software module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although this invention has been described with a certain degree of particularity. it is to be understood that the present disclosure has been made only by way of illustration and that numerous changes in the details of construction and arrangement of parts may be resorted to without departing from the spirit and the scope of the invention.

What is claimed is:

1. A digital circuit implementing a machine learning model inference engine for one or more models, wherein the machine learning model inference engine takes, as inputs, a set of measurements of an external system as delivered to the digital circuit by the external system, and produces, as an output, a final answer prediction of one-or-more attribute of the external system based on the inputs by applying one-or-more machine learning neural networks, the digital circuit comprising:

a hub-and-spoke data transfer architecture for each of the one or more models, wherein each of the one or more model comprises a neural network having an input layer, a fixed number of intermediate layers, an output layer, and optionally an alert layer, wherein the input layer, the fixed number of intermediate layers, the output layer, and the optional alert layer are processed sequentially, wherein processing occurs at each layer by a plurality of neurons, said plurality of neurons comprising a first neuron set, a second neuron set, and zero, one, or more than one additional neuron sets for any remaining layers; and a plurality of hub nodes comprising a first hub node, a second hub node, and zero, one, or more than one additional hub nodes for any remaining layers, wherein the first neuron set is not directly connected to any neurons in the second neuron set and is further not directly connected to any neurons in the third neuron set, wherein the neurons in the first neuron set are only connected to the first hub node, wherein the neurons in the second neuron set are only connected to the second hub node, wherein the neurons in the third neuron set are only connected to the third hub node;

wherein all data transfers between and among each of the first layer, second layer, and third layer take place hub-to-hub, such that the data transfers between the first layer and the second layer occur between the first hub node and the second hub node, and the data transfers between the second layer and the third layer occur between the second hub node and the third hub node, wherein the first hub provides the first set of neurons with data needed by the first set of neurons to perform respective computations within the neural network, wherein the second hub node provides the second set of neurons with data needed by the second set of neurons to perform respective computations within the neural network, wherein the third hub node provides the third set of neurons with data needed by the third set of neurons to perform respective computations within the neural network, and wherein the respective computations optionally proceed sequentially to any remaining layers, in excess the third layer, to a final layer of the model.

2. The digital circuit of claim 1, wherein the neural network inference engine is an inference engine that can perform inference for one or more of the following: feedforward neural networks, recurrent neural networks, convolutional neural networks, Hopfield neural networks, Adaptive Resonance Theory neural networks, Kolmogorov-Arnold neural networks, more complex neural networks that combine elements from each of these neural network types, decision trees where each level of the decision tree is treated as a neural network layer and the decision boxes at each level treated like a neuron.

3. The digital circuit of claim 2, wherein the wire interconnections of hubs and neurons are used to implement additional neural network types, where the weights-and-bias computation circuits, the layer-to-layer sequence routing circuits, the input quantization and transformation circuits, and the alert generation circuits are sufficient to do the computations required by these additional models.

4. The digital circuit of claim 1, wherein communications between the plurality of hub nodes and the neurons are selectively configured for half-duplex and for full-duplex communications depending on design considerations involving cost and inference execution time.

5. The digital circuit of claim 1, wherein each of the neurons conveys results of the respective computations back to a respective one of the plurality of hub nodes, wherein neuron processing for each of the plurality of hub nodes is configurable as being either serial or parallel.

6. The digital circuit of claim 1, wherein the respective computations are each a summation of pre-defined weights multiplied by input-data for each input-data value.

7. The digital circuit of claim 6, wherein a predefined bias is added and then an activation function is applied subsequent to the summation of pre-defined weights.

8. The digital circuit of claim 1, wherein each hub is configured to selectively skip the respective computations involving a multiplication by zero when a processing of weights and data is wired to be serial, wherein no skipping of the respective computations occurs when a processing of weights and data is wired to be parallel.

9. The digital circuit of claim 1, wherein hub-neuron communications channels are conducted via shared access to a shared register, instead of point-to-point wiring.

10. The digital circuit of claim 1, wherein hub-to-hub communications are conducted via shared global runtime memory instead of or in addition to (in any combination) hub-to-hub wiring of any type, including but not limited to (a) point-to-point with forwarding of communications to other hubs that an in the layers with higher layer numbers than the hub initiating communications, (b) a separate bus directly wired as part of the digital circuit or using over-the-top wiring on an additional component in the digital circuit, (c) via a star interconnect topology where each hub is directly connected to every other hub, or (d) a switched system with a digital circuit component in the center to which every hub is connected, including a configuration where:

one of the hubs has a processor added to it that lets it be the digital circuit component in the center, and where routing instructions and specification of the hub in the layer with the next higher layer number in all cases are stored either in registers in a hub or accessed by a hub from a look-up table or a central processor in digital circuit itself or on an additional circuit board that all hubs have access to (such storage or access also contains the current numeric values needed by each hub—individually for each hub—in particular the number of neurons for that hub, and weights, bias value, and activation function parameters for each such neuron).

11. The digital circuit of claim 1, wherein the neural network is a recurrent neural network (RNN) requiring data feedback from a layer to itself or a previous layer.

12. The digital circuit of claim 11, wherein the required data feedback of the RNN is implemented via one or more hubs retaining or looping-back a copy of the data the hub forwards on to the hub in the layer with the next higher sequence, and/or sending this data to any hub in a layer with a smaller sequence number, so that previously computed values for a given layer can be used when processing subsequent input values at that layer or previous layers.

13. The digital circuit of claim 1, wherein the value computed at a set of neurons of a hub can be used to change the sequential one-layer-after-the-next processing order of layers via jumping to any other subsequent layer's hub with a higher layer number, including a "non-jump" jump to the next hub in sequence with a layer number one greater than the current hub, which would have been the next hub to process anyway, optionally supplying that jumped-to hub with the computed value of the neuron's of the hub originating the jump, including (a) jumping to the final layer thereby terminating the inference and supplying the final answer prediction for a particular set of inputs, and (b) simply supplying its computed value to subsequent hubs by adding it to the data moved from hub-to-huh from that point forward thereby delivering it to all hubs with higher layer numbers subsequently having data delivered to, including it in an increasing number of the same types of data already being sent from previous hubs, all such values being available for use by the neurons in hubs that receive as additional data in any hub's calculations.

14. The digital circuit of claim 13, wherein computations that lead to changing the sequential one-layer-after-the-next processing order of the hub processing order, is done by a programmable CPU, GPU, or NPU device embedded in a hub, such programmable CPU/GPU/NPU device embedded for some or all hubs, or by a central programmable CPU/GPU/NPU device in the digital circuit board that all hubs have access to or by an external programmable CPU/GPU/NPU device running in another digital circuit in the local data center, in a remote data center, or in the Cloud that communicates via telecommunications.

15. The digital circuit of claim 14, wherein the change to the sequential one-layer-after-the-next processing order of the hub processing order and the delivery of the data values computed by the neuron s of the hub originating the jump is made permanent for all following data instances presented for inference, until such time as it is changed again.

16. The digital circuit of claim 1, wherein there is only a single layer, thereby implementing a fully inter-connected neuron-to-neuron network, which is a Hopfield network, but neuron-to-neuron communications are done through a single hub, not directly neuron-to-neuron, using either hub-to-neuron wiring, or hub-neuron shared registers.

17. The digital circuit of claim 1, wherein the hub of the first layer optionally has a programmable CPU/GPU/NPU device built into it to directly receive and pre-process as necessary all data input sets supplied to the neural network for inference, eliminating the need for an input layer in the network, where the necessary pre-processing can consist of one or more of (a) scaling and quantization, (b) statistically estimating scaling and quantization parameters via standard statistical techniques, (c) vectorization of text data either using an external neural network transformer or using value pre-stored in the digital circuit values in a look up table) of word vectors from an LLM Large Language Model, (d) time-series transformations (including lags, differences, filters and transforms, (e) power transformations (on one input, including logs, and Box-Cox transformations, (f) multiplicative transformations on two or more inputs and (g) statistical testing for changes in the statistical distribution of data inputs to the first layer using multivariate statistical tests.

18. The digital circuit of claim 1, wherein the digital circuit components and wires, and the data inputs are divided into M multiple subsets, disjoint or overlapping, known as Fields or Receptive Fields, each with its own hubs, thereby implementing a Convolutional Neural Network (CNN), and the circuit itself is replicated K times, thereby allowing K of the M fields to be processed either sequentially in series, or simultaneously in parallel, or any combination of series and parallel, with each of the final layer hub communicating results to an additional hub, known as a final master hub, or a programmable CPU/GPU/NPU device, which, when all M fields have been processed and results reported, computes the model final answer prediction through a convolution operation as is done in standard CNNs.

19. The digital circuit of claim 1, wherein the data inputs are replicated as a whole set M times, each input-data-replicate run through one of K replicates of the circuit, each of the K circuit-replicates having its own model, with hubs and h different weights, biases, and activation function parameters, thereby implementing an ensemble machine learner, with each of the K running either sequentially in series, or simultaneously in parallel, or any combination of series and parallel, with each of the final layer hubs communicating results to an additional hub, known as a final-master hub, or a programmable CPU/GPU/NPU device, which, when all M replicates have been processed and each of the M model final answers reported, computes the an overall model final answer through a data fusion operation as is done in standard ensembles, where such data fusion can be based on weighted averages, or an answer-selection function which chooses one of the K model final answer, with weights or choice of answer-selection function depending on the pre-determined or observed by the digital circuit accuracy of the M replicates, or on what particular partition of the data input universe for previously defined partitions based on statistical clustering the current input set falls, or a combination of both.

20. The digital circuit of claim 19, wherein there are only hubs, no neurons for any hub, with processors in each hub making a routing decision as to the next hub to be passed results and continue processing, or to decide processing is complete and passing results that serve as the final answer prediction to the final hub in the final layer to be reported, the hub decision based on the input variables with their associated weights serving as thresholds (greater, less-than, equal) values, not multipliers, and no bias values, and no activation function, thereby implementing a decision-tree machine learning system or an ensemble or forest of such trees, since the hubs making threshold comparisons implement the test-and-branch operations of a decision tree, therefore all hub comparisons that will be invoked could in fact be done in parallel, potentially even in advance with the results stored in a look up able in the digital circuit, thereby going from initial presentation of input data to the final decision hub in one operation.

21. The digital circuit of claim 19, wherein the data fusion is not based on averages or a specified answer-selection function, but rather the running of a meta-learning model, where that meta-learning model is itself implemented via a sub-circuit of the digital circuit, using any kind of machine learning model, including models based on not just neural networks, but on decision trees or discrete-valued choice or ranking applied to the set of all model final answers.

22. The digital circuit of claim 19, wherein with K sub-models, but the K models are not replicate-like versions of a single model with only weights, biases, and activation functions different, but each can be a wholly different model, some of them neural networks of any type, and some of them decision trees, thereby implementing a mixed hybrid configuration, where some hubs have neurons and do standard weights, bias, and activation function calculations, and other hubs have no neurons and make threshold comparisons implementing the test-and-branch operations of decision trees, thus building an ensemble mixing in any combination elements from, or entire sub-models of feed forward, RNN, CNN, Hopfield, and neural networks combining these, and/or decision-tree learner, with or without the first hub of each sub-model eliminating the need for an input layer, and therefore in addition to an ensemble configuration, this same arrangement allows use of federated, cooperating, adversarial and swarm systems of inference engines, the differences in these systems being the information and results shared or not shared between and among members of these collectives of engines.

23. The digital circuit of claim 1, wherein communications between hubs can be fully-connected direct point-to-point wiring topology, or a star topology where each hub is at the end of a star spoke and center of the star is a either (1) a special routing processor or (2) a hub that has only the purpose of routing hub-to-hub traffic; alternatively one of the processing hubs can serve as the routing hub as well as doing its regular work, or a star topology where each hub is at the end of a star poke but the center of the star is an on-board CPU which can route, or a bus topology where each hub can route data to other hubs on the bus, or a next-neighbor, fixed neighbor or nearest neighbor topology where hubs pass data they receive that is not intended for them but rather intended for the huh of some other layer on to their neighbor until the data reaches its destination.

24. The digital circuit of claim 23, wherein the digital circuit is implemented as follows: collections of hubs, the collection being a subset of all hubs, connected as in claim 22, are then considered like a single hub, and connected to other subset-of-hubs considered like a single hub, all connected in one of the ways specified in claim 22.

25. The digital circuit of claim 4, wherein the digital circuit is combined with modifying the order of layer processing, coupled with the decision-making ability of a processor in one or more hubs, allowing input data processing to be terminated early, or one or more hubs to be skipped, either because the final answer prediction of the model has been sufficiently determined, or because an error as occurred and has to be reported.

26. The digital circuit of claim 1, wherein each hub can be individually, or all together, designed to transfer data to and from each of the neurons to which it is connected in parallel or in series, or a combination thereof, the decision made either statically at digital circuit build time, or dynamically during inference, such decision based on cost and speed-of-inference processing considerations.

27. The digital circuit of claim 15, wherein not only can the run-time configuration (number of layers, number of neurons per layer, i.e., the depth and width of the network, known as the "shape" of the network) and the computational sequencing (computational graph) be changed dynamically "on the fly", but some or all of the model parameters (weights, biases, activation function parameters) can be changed as well, at any time, in a controlled and orderly fashion, implementing a "Load Mode", that accomplishes these changes while pausing the continuous processing of input data if there are no pre-scheduled or observed downtime periods (times when no inputs are presented) available.

28. The digital circuit of claim 1, wherein the addition of a triggering event for triggering a full or partial model parameter change which triggering event is an arriving signal from an external local or remote processing system which also supplies the new parameter values in response to a machine learning model re-run or improvement undertaken on the external system, including multiple external systems, running on the same hardware as the digital circuit or different hardware, updating one or more inference engines on the digital circuit, with the same or different updates based on training and/or retraining of multiple machine learning models on one or more of multiple external systems, where one, some, or all of the external systems could be running an exact clone, continuously, sporadically, or scheduled, of the basic model tor collections of models running on the digital circuit.

29. The digital circuit of claim 28, wherein the triggering event for making full or partial model parameter changes is a signal from a programmable CPU/GPU/NPU device, on the digital circuit itself, or a CPU/GPU/NPU implemented in a second digital circuit adjacent to the circuit that is tracking model inference performance, when model inference accuracy statistics are available from an external source, that CPU/GPU/NPU is running a machine learning model itself, training and estimating a model that has the potential to improve the current model running on the digital circuit, and, if there is an improvement, is used to replace or modify the current model via the triggering event.

30. The digital circuit of claim 1, wherein the inference engine is being used to produce prediction final answers that are state-changes in a real-world running system and optionally alerting that real-world running system to predicted state-changes of certain types, and where the actual current system state is an input to the inference engine at every data w-input time, or at some periodic or random input times, or manually entered at any point in time, thus providing prediction-accuracy tracking to guide parameter value changes.

31. The digital circuit of claim 1, wherein the digital circuit is manufactured with additional hub and "neuron space" circuits that are initially unused but which can be changed to be in use automatically and in real-time in response to changes to the model number of layers and neurons per layer as dictated by commands from external servers or on-board programmable CPU/GPU/NPU devices; unused hubs can have their power turned off, and turned back on when they changed to be in use.

32. The digital circuit of claim 31, wherein a specific model change order is to add one or more neurons to a particular hub, but the are no spare neuron circuit components available that can connect to that hub, so since spare hubs that can in fact be connected to spare neurons do exist in the digital circuit, the digital circuit is built with logic to support the following: any hub can have one or more "helper" hubs, assigned from the collection of unused hubs, connected to it, and the neurons connected to any hub's helper hubs are treated as if they are neurons connected to the hub itself, plus helper hubs can themselves have helper hub which in particular digital wiring configurations might be more economical (smaller wire lengths) than connecting multiple helper hubs directly to a single hub.

33. The digital circuit of claim 1, wherein the loading process of numeric weights and biases for use by neurons, and the loading of input data values to be run though the model, automatically scales the numeric values to signed integers in a specific range the range determined by the value of B chosen during the manufacturing of the digital circuit, where B is the number of bits used for integer arithmetic for any particular design of the digital circuit; this capability implemented as an option to allow skipping the scaling if the model developers have already run a distillation/quantization process that has the same result, and furthermore the circuit can be manufactured to restrict certain numeric values to use less bits than B, for any number b less then B, to meet cost and power requirement minimization goals, where different values of b can be used on different parts of the circuit.

34. The digital circuit of claim 1, wherein the input data have been transformed and manipulated as received, and done so iteratively as necessary, to allow (a) facet-masking which is the selective blocking of all data inputs of data types as specified by the machine learning model, for example day-of-week values or zip codes, known as facets thereby reducing noise in the inputs that negatively affects the models, repeated over different selections of one or a group of facets to mask, (b) time-series transformations on numeric data collected over time, such transformations being differences, exponential smoothing, Kalman filtering, ARIMA and GARCH transformations, where the parameters of such functions are either fixed in advance or not fixed in advance but are estimated and/or learned, iteratively or sequentially from the data presented for inference or from the model outputs, adjusting initially-provided values as necessary, to produce inputs that yield more accurate machine learning model final answer, and (c) the replacement of textual inputs, either in their entirety or divided into chunks, with dense vectors from a Large Language Model, such vectors derived from running an external or on the digital circuit transformer-type neural network, or fetched from a memory store or lookup table that holds pre-computed vectors for individual words and phrases, with the vector dimension as is or reduced from the originally Large Language Model vectors, these word-and-phrase vectors then averaged over all the words and phrases in the text inputs or text chunks, and/or the vector distances from these inputs or chunks to one or more vectors computed on specific text representing important queries, prompts, topics, events, explanations or descriptions potentially important to the particular application.

35. The digital circuit of claim 1, wherein, when an activation function is used in the model for which this circuit is serving as an inference engine, the activation function is (1) a standard activation function used in machine learning, computed if necessary by use of a neuron-accessible floating-point-capable CPU/GPU/NPU, or in a preferred embodiment, (2) a piecewise spline, a linear spline in a preferred embodiment, which is used as a universal approximator to an activation function, where the parameters of this spline can be defined, refined, tuned, optimized and updated using a data-load protocol not just initially, but on-the-fly during running of the inference engine as well, using a neuron-accessible CPU with fixed-point operations only, as required by this spline.

36. The digital circuit of claim 1, wherein all arithmetic operations are executed an signed integer values or unsigned integer values only, with the arithmetic operations restricted to a pre-defined subset of the arithmetic operations that are generally supported by general-purpose CPUs, the restricted set is chosen specifically to accommodate the models for which the digital circuit is built.

37. The digital circuit of claim 1, wherein computations on inputs which are text strings are limited to the first Z characters of each words, in the text string, on a word-by-word basis, where Z is determined either in advance or at digital circuit run time and supplied as an input to the hub doing input processing.

38. The digital circuit of claim 1, wherein data inputs, in addition to being numeric, text, images, audio, and video, can be discrete multinomial, categorical, or ordinal data with alphanumeric labels, handled as numeric data through encoding and/or partitioning, ordinal data can be converted to Boolean by grouping together all values less than, and grouping all values greater-or-equal than, one of the ordinal values designated as a middle point.

39. The digital circuit of claim 1, wherein accuracy tracking is implemented and modifications to layer-to-layer data routing along with changes to neuron parameters that increase accuracy based on this accuracy as tracking, the recording of all input data values, and output data from every hub, and output final predictions are stored for a range of historical time periods in any type of storage, including but not limited to circular buffers, for a range extent based on memory available in the digital circuit, with the capability to conserve storage requirements by storing only subsets of historical data that have been deemed, by industry-standard calculations, to be particularly influential or impactful on the model's operation and/or predictions/final answers.

40. The digital circuit of claim 1, wherein the digital circuit's instantiation of hubs, neurons, the layer-to-layer data routing, the neuron parameters, and the final prediction and alert rules for all models, as well as the digital circuit's operation to update, expand, delete, and modify these, is accomplished by inputting to the digital circuit a structured language of symbols and values, applied in a cascading manner; the digital circuit contains a special purpose processor to parse and execute this language.

41. The digital circuit of claim 40, wherein the digital circuit is implemented on an ASIC, a standard FPGA, a special type of FPGA that omits field-programmability except for the instantiations and updates/expansions/deletions/modifications, or for convenience a general purpose CPU or NPU.

42. The digital circuit of claim 1, wherein communications to a server in a local, remote, or cloud data center is two way, allowing the server to learn, and optionally simulate, the digital circuit in real time, on a scheduled basis, or an ad-hoc, or sporadic basis.

\* \* \* \* \*